United States Patent
Weingarten

(10) Patent No.: US 9,501,392 B1
(45) Date of Patent: Nov. 22, 2016

(54) MANAGEMENT OF A NON-VOLATILE MEMORY MODULE

(71) Applicant: DENSBITS TECHNOLOGIES LTD., Haifa (IL)

(72) Inventor: Hanan Weingarten, Herzelia (IL)

(73) Assignee: AVAGO TECHNOLOGIES GENERAL IP (SINGAPORE) PTE. LTD., Yishun (SG)

( * ) Notice: Subject to any disclaimer, the term of this patent is extended or adjusted under 35 U.S.C. 154(b) by 37 days.

(21) Appl. No.: 14/282,204

(22) Filed: May 20, 2014

Related U.S. Application Data

(63) Continuation-in-part of application No. 13/859,497, filed on Apr. 9, 2013, which is a continuation-in-part of application No. 13/434,083, filed on Mar. 29, 2012, now Pat. No. 8,996,790.

(60) Provisional application No. 61/485,397, filed on May 12, 2011.

(51) Int. Cl.
*G06F 12/02* (2006.01)

(52) U.S. Cl.
CPC ....... *G06F 12/023* (2013.01); *G06F 2212/304* (2013.01)

(58) Field of Classification Search
CPC ............. G06F 12/023; G06F 12/0246; G06F 2212/304
See application file for complete search history.

(56) References Cited

U.S. PATENT DOCUMENTS

| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |

(Continued)

FOREIGN PATENT DOCUMENTS

WO WO2009053963 A2 4/2009

OTHER PUBLICATIONS

Search Report of PCT Patent Application WO 2009/118720 A3, Mar. 4, 2010.

(Continued)

*Primary Examiner* — David X Yi
*Assistant Examiner* — Ramon A Mercado
(74) *Attorney, Agent, or Firm* — Reches Patents

(57) ABSTRACT

A method of managing a non-volatile memory device, the method comprising receiving data sectors; wherein each data sector belongs to a memory space subset out of multiple memory space subsets; wherein the multiple memory space subsets comprise a plurality of logical memory blocks; wherein the memory space is partitioned to the multiple memory space subsets based upon expected or monitored memory access patterns; writing each data sector into a data block that is allocated to a memory space subset that is associated with the data sector; wherein the data block belongs to a buffer of the non-volatile memory device; maintaining a management data structure that comprises location metadata about a location of each data sector in the buffer; and merging, if a criterion is fulfilled and before the buffer becomes full, data sectors stored at different data blocks and belong to a same set of logical memory blocks into a sequential portion of the non-volatile memory device, wherein the sequential portion differs from the buffer.

24 Claims, 21 Drawing Sheets

(56) References Cited

U.S. PATENT DOCUMENTS

| | | |
|---|---|---|
| 5,003,597 A | 3/1991 | Merkle |
| 5,077,737 A | 12/1991 | Leger et al. |
| 5,297,153 A | 3/1994 | Baggen et al. |
| 5,305,276 A | 4/1994 | Uenoyama |
| 5,592,641 A | 1/1997 | Doyle et al. |
| 5,623,620 A | 4/1997 | Ranjeet et al. |
| 5,640,529 A | 6/1997 | Hasbun |
| 5,657,332 A | 8/1997 | Auclair et al. |
| 5,663,901 A | 9/1997 | Harari et al. |
| 5,724,538 A | 3/1998 | Bryg |
| 5,729,490 A | 3/1998 | Calligaro et al. |
| 5,740,395 A | 4/1998 | Hasbun |
| 5,745,418 A | 4/1998 | Hu et al. |
| 5,778,430 A | 7/1998 | Giovannetti |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Hu et al. |
| 5,956,268 A | 9/1999 | Lee |
| 5,956,473 A | 9/1999 | Hu et al. |
| 5,968,198 A | 10/1999 | Balachandran |
| 5,982,659 A | 11/1999 | Irrinki et al. |
| 6,011,741 A | 1/2000 | Harari et al. |
| 6,016,275 A | 1/2000 | Han |
| 6,038,634 A | 3/2000 | Ji et al. |
| 6,081,878 A | 6/2000 | Estakhri |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,324,620 B1 * | 11/2001 | Christenson ............ G06F 3/061 710/74 |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett |
| 7,388,781 B2 | 6/2008 | Litsyn |
| 7,395,404 B2 | 7/2008 | Gorobets |
| 7,441,067 B2 | 10/2008 | Gorobets et al. |
| 7,443,729 B2 | 10/2008 | Li |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell |
| 7,619,922 B2 | 11/2009 | Li |
| 7,697,326 B2 | 4/2010 | Sommer et al. |
| 7,706,182 B2 | 4/2010 | Shalvi et al. |
| 7,716,538 B2 | 5/2010 | Gonzalez |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun |
| 7,961,797 B1 | 6/2011 | Yang et al. |
| 7,975,192 B2 | 7/2011 | Sommer |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,161,241 B2 * | 4/2012 | Bhattacharjee ........ G05D 23/19 711/112 |
| 8,190,961 B1 | 5/2012 | Yang |
| 8,250,324 B2 | 8/2012 | Haas |
| 8,300,823 B2 | 10/2012 | Bojinov |
| 8,305,812 B2 | 11/2012 | Levy |
| 8,327,246 B2 | 12/2012 | Weingarten |
| 8,407,560 B2 | 3/2013 | Ordentlich |
| 8,417,893 B2 | 4/2013 | Khmelnitsky |
| 8,667,211 B2 * | 3/2014 | Weingarten ......... G06F 12/0246 711/103 |
| 2001/0034815 A1 | 10/2001 | Dugan et al. |
| 2002/0063774 A1 | 5/2002 | Hillis et al. |
| 2002/0085419 A1 | 7/2002 | Choi |
| 2002/0154769 A1 | 10/2002 | Petersen et al. |
| 2002/0156988 A1 | 10/2002 | Sekibe |
| 2002/0174156 A1 | 11/2002 | Birru |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Jeong |
| 2003/0192007 A1 | 10/2003 | Miller et al. |
| 2004/0015771 A1 | 1/2004 | Lasser et al. |
| 2004/0030971 A1 | 2/2004 | Shibata |
| 2004/0059768 A1 | 3/2004 | Denk |
| 2004/0080985 A1 | 4/2004 | Chang et al. |
| 2004/0153722 A1 | 8/2004 | Lee |
| 2004/0153817 A1 | 8/2004 | Chevallier |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata |
| 2005/0172179 A1 | 8/2005 | Brandenberger et al. |
| 2005/0213393 A1 | 9/2005 | Lasser |
| 2005/0243626 A1 | 11/2005 | Ronen |

(56) References Cited

U.S. PATENT DOCUMENTS

| | | |
|---|---|---|
| 2005/0251617 A1* | 11/2005 | Sinclair .................. G06F 3/061 711/103 |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0282610 A1* | 12/2006 | Dariel .................. G06F 3/0616 711/103 |
| 2006/0284244 A1 | 12/2006 | Forbes |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0005452 A1* | 1/2008 | Suda ..................... G06F 11/348 711/103 |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee |
| 2008/0082729 A1* | 4/2008 | Moon .................. G06F 12/0246 711/103 |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim |
| 2008/0116509 A1 | 5/2008 | Harari et al. |
| 2008/0126686 A1 | 5/2008 | Sokolov et al. |
| 2008/0127104 A1 | 5/2008 | Li |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1* | 11/2008 | Shalvi .................. G06F 11/1068 714/6.12 |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park |
| 2009/0043951 A1 | 2/2009 | Shalvi et al. |
| 2009/0046507 A1 | 2/2009 | Aritome |
| 2009/0055618 A1* | 2/2009 | Nakanishi ........... G06F 12/0246 711/173 |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0144598 A1 | 6/2009 | Yoon |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi |
| 2009/0287930 A1 | 11/2009 | Nagaraja |
| 2009/0300269 A1 | 12/2009 | Radke et al. |
| 2009/0323942 A1 | 12/2009 | Sharon |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0064111 A1* | 3/2010 | Kunimatsu ............. G06F 12/08 711/161 |
| 2010/0088557 A1* | 4/2010 | Weingarten ......... G06F 11/1068 714/704 |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1* | 5/2010 | Weingarten ......... G06F 11/1072 714/54 |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1* | 7/2010 | Gorobets ............ G06F 12/0246 365/185.09 |
| 2010/0174853 A1 | 7/2010 | Lee |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette |
| 2010/0293321 A1 | 11/2010 | Weingarten |
| 2010/0318724 A1 | 12/2010 | Yeh |
| 2011/0010489 A1* | 1/2011 | Yeh ..................... G06F 12/0246 711/103 |

(56) References Cited

U.S. PATENT DOCUMENTS

| | | |
|---|---|---|
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang |
| 2011/0209028 A1 | 8/2011 | Post |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0124273 A1 | 5/2012 | Goss et al. |
| 2012/0246391 A1 | 9/2012 | Meir |
| 2012/0278532 A1* | 11/2012 | Bolanowski ........ G06F 12/0246 711/103 |
| 2012/0303873 A1* | 11/2012 | Nguyen ................ G06F 3/0616 711/103 |
| 2014/0006898 A1* | 1/2014 | Sharon ................ H03M 13/356 714/755 |

OTHER PUBLICATIONS

Search Report of PCT Patent Application WO 2009/095902 A3, Mar. 4, 2010.
Search Report of PCT Patent Application WO 2009/078006 A3, Mar. 4, 2010.
Search Report of PCT Patent Application WO 2009/074979 A3, Mar. 4, 2010.
Search Report of PCT Patent Application WO 2009/074978 A3, Mar. 4, 2010.
Search Report of PCT Patent Application WO 2009/072105 A3, Mar. 4, 2010.
Search Report of PCT Patent Application WO 2009/072104 A3, Mar. 4, 2010.
Search Report of PCT Patent Application WO 2009/072103 A3, Mar. 4, 2010.
Search Report of PCT Patent Application WO 2009/072102 A3, Mar. 4, 2010.
Search Report of PCT Patent Application WO 2009/072101 A3, Mar. 4, 2010.
Search Report of PCT Patent Application WO 2009/072100 A3, Mar. 4, 2010.
Search Report of PCT Patent Application WO 2009/053963 A3, Mar. 4, 2010.
Search Report of PCT Patent Application WO 2009/053962 A3, Mar. 4, 2010.
Search Report of PCT Patent Application WO 2009/053961 A3, Mar. 4, 2010.
Search Report of PCT Patent Application WO 2009/037697 A3, Mar. 4, 2010.
Yani Chen, Keshab K. Parhi, "Small Area Parallel Chien Search Architectures for Long BCH Codes", Ieee Transactions On Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-72 vol. 2.
Michael Purser, "Introduction To Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips. com), Oct. 2005.
Todd K. Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions On Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built In Self Diagnosis", ITC International Test Conference, Paper 2.1, Feb. 2005.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com, 2005.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26, Dec. 2007.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

* cited by examiner

Selecting an allocation, out of a set of allocations of logical memory blocks to the multiple buffers, that exhibits a lowest write amplification value. 1821

Allocating for each buffer (Bi) of the multiple buffers a number (Nj) of logical memory blocks, wherein the number of logical blocks allocated to each buffer is responsive to (a) a sum (Pj) of temperatures of logical memory blocks allocated to the buffer, (b) a relative size (Rj) of the buffer, and (c) a number (Nnac) of logical memory blocks of the non-volatile memory device that are not accessible to a user. 1822

Allocating so that Ni equals Nac multiplied by a ratio between (a) a square root of (Pj*Rj), and (b) a sum, over all buffers of a square root of (Pj*Rj). 1823

Calculating for each allocation out of multiple allocations an allocation metric to provide multiple allocation metrics; wherein the multiple allocations differ from each other by a re-allocation of memory blocks of extremum temperatures. 1824

Selecting a selected allocation out of the multiple allocations in response to values of the multiple metrics. 1825

MANAGEMENT OF A NON-VOLATILE MEMORY MODULE

CROSS REFERENCE TO RELATED APPLICATIONS

This application is a continuation in part of U.S. patent application Ser. No. 13/859,497, filed on Apr. 9, 2013, entitled "ADVANCED MANAGEMENT OF A NON-VOLATILE MEMORY," which in turn is a continuation in part of U.S. patent application Ser. No. 13/434,083, filed on Mar. 29, 2012, entitled "SYSTEM AND METHOD FOR FLASH MEMORY MANAGEMENT," which claims priority from U.S. provisional patent Ser. No. 61/485,397, filed on May 12, 2011. This application is related to U.S. patent application Ser. No. 14/045,681, filed on Oct. 3, 2013, entitled "ORDERED MERGE OF DATA SECTORS THAT BELONG TO MEMORY SPACE PORTIONS," to U.S. patent application Ser. No. 14/050,913, filed on Oct. 10, 2013, entitled "ADVANCED MANAGEMENT OF A NON-VOLATILE MEMORY," and to U.S. patent application Ser. No. 14/097,386, filed on Dec. 4, 2013, entitled "ADVANCED MANAGEMENT OF A NON-VOLATILE MEMORY," the disclosures of which are incorporated by reference herein in their entireties.

BACKGROUND

Flash memory devices store information with high density on Flash cells with ever smaller dimensions. In addition, Multi-Level Cells (MLC) store several bits per cell by setting the amount of charge in a cell. Flash memory devices are organized into (physical) pages. Each page includes a section allocated for data (512 bytes-8 Kbytes and expected larger in the future) and a small amount of spare bytes (64-512 or more bytes for every page) for storing redundancy and metadata. The redundancy bytes are used to store error correcting information, for correcting errors, which may have occurred during flash lifetime, and the page read process. Each program operation is performed on an entire page. A number of pages are grouped together to form an Erase Block (erase block). A page cannot be erased unless the entire erase block, which contains it is erased.

One common application of flash memory devices is Secure Digital (SD) cards and embedded Multi-Media Cards (eMMC). An SD/eMMC card may typically contain flash memory devices and a flash memory controller. The controller translates commands coming in through the SD/eMMC interface into actions (Read/Write/Erase) on the flash memory devices. The most common SD/eMMC commands may be Read and Write commands of one or more sectors, where a sector may be, but is not limited to, a sequence of 512 bytes. The Read or Write commands may be of a single sector or multiple sectors. These commands may refer to logical addresses. These addresses may then be redirected to new addresses on the flash memory, which need not directly correspond to the logical addresses that might be referenced by the Read or Write commands. This is due to memory management that may be carried out by the flash memory controller in order to support several features such as wear-leveling, bad block management, firmware code and data, error-correction, and others. The erase function is performed on an entire erase block. Because of this functionality, before the data of a certain block may be replaced such as during a write function, the new data must be written in an alternative location before an erase can occur, to preserve the integrity of the stored data.

Due to the small dimensions of a typical SD/eMMC card and the price limitations, the controller may typically have only a small RAM available for storage. The small size of the RAM memory limits the type of memory management, which may be carried out by the controller with regard to the data stored in the flash memory device and received from the interface.

The controller may typically manage the memory at the erase block level, because managing data of small particle sizes becomes difficult. That is, the logical memory space may be divided into units of memory contained within a single erase block or some constant multiple of erase blocks, such that all logical sector addresses within each said unit of memory may be mapped to the same erase block or some constant multiple thereof.

This type of management has the drawback that for writing random access data sectors to memory or other memory units smaller than an erase block, erase blocks must be frequently rewritten. Because of the characteristics of flash memory, each new piece of information is written into an empty page. In flash memory, a page may not be rewritten before the entire erase block is erased first.

If a portion of the memory unit contained within an erase block may need to be rewritten, it is first written into a freshly allocated erased erase block. The remaining, unmodified, contents of the erase block may then be copied into the new erase block and the former erase-block may be declared as free and may be further erased. This operation may be referred to as "sealing" or "merging". The operation involves collecting the most recent data of a logical block and then merging it with the rest of the block data in a single erase block. Thus, even if a single sector from an erase block is rewritten, a complete erase block would be rewritten.

This may result in causing a significant degradation in the average write speed. It may also impose a significant delay in the response time between random write sector operations. It also may cause excessive P/E (program/erase) cycling, which may be problematic in new generations of flash memory devices where the number of P/E cycles is limited to a few thousand or even a few hundreds.

The controller is used to manage the overhead described above, and must always keep track of the data associated with each logical address and the actual memory location. This is usually achieved by implementing a mapping method between the logical address space assigned to the data and the actual memory storage location of the data.

Several methods may be implemented to execute such a mapping. Two approaches implement mapping systems that rely on block mapping and page mapping, respectively. In an approach using block mapping, each physical block in the flash memory is mapped to a contiguous logical memory block of the same data size (LBA). In this approach when one page in some logical block is updated, the entire associated physical block must be copied to a fresh block, and the new data must be written in place of the obsolete copy.

SUMMARY

According to an embodiment of the invention various methods, non-transitory computer readable media, and systems may be provided and may be described in the specification.

A method may be provided for managing a non-volatile memory device, the method may include receiving data sectors; wherein each data sector belongs to a memory space subset out of multiple memory space subsets; wherein the multiple memory space subsets may include a plurality of logical memory blocks; writing each data sector into a data block that is allocated to a memory space subset that is associated with the data sector; wherein the data block belongs to a buffer of the non-volatile memory device; maintaining a management data structure that may include location metadata about a location of each data sector in the buffer; and merging, if a criterion is fulfilled and before the buffer becomes full, data sectors stored at different data blocks and belong to a same set of logical memory blocks into a sequential portion of the non-volatile memory device, wherein the sequential portion differs from the buffer.

A method may be provided for managing a non-volatile memory device, the method may include receiving data sectors; wherein each data sector belongs to a memory space subset out of multiple memory space subsets; wherein the multiple memory space subsets may include a plurality of logical memory blocks; wherein the memory space is partitioned to the multiple memory space subsets based upon expected or monitored memory access patterns; writing each data sector into a data block that is allocated to a memory space subset that is associated with the data sector; wherein the data block belongs to a buffer of the non-volatile memory device; maintaining a management data structure that may include location metadata about a location of each data sector in the buffer; and merging, if a criterion is fulfilled and before the buffer becomes full, data sectors stored at different data blocks and belong to a same set of logical memory blocks into a sequential portion of the non-volatile memory device, wherein the sequential portion differs from the buffer.

The method may include partitioning the memory space to the multiple memory space subsets based upon expected or monitored memory access patterns.

The method may include repeating, at different points in time, a partitioning the memory space to the multiple memory space subsets based upon expected or monitored memory access patterns.

The monitored memory access patterns represent temperatures of the multiple memory space subsets; wherein a temperature of a memory space subset represents an access frequency to the memory space subset.

The multiple memory space subsets may differ from each other by their associated temperature ranges.

A non-transitory computer readable medium may be provided that stores instructions that once executed by a memory controller cause the memory controller to receive data sectors; wherein each data sector belongs to a memory space subset out of multiple memory space subsets; wherein the multiple memory space subsets may include a plurality of logical memory blocks; wherein the memory space is partitioned to the multiple memory space subsets based upon expected or monitored memory access patterns; write each data sector into a data block that is allocated to a memory space subset that is associated with the data sector; wherein the data block belongs to a buffer of the non-volatile memory device; maintain a management data structure that may include location metadata about a location of each data sector in the buffer; and merge, if a criterion is fulfilled and before the buffer becomes full, data sectors stored at different data blocks and belong to a same set of logical memory blocks into a sequential portion of the non-volatile memory device, wherein the sequential portion differs from the buffer.

The non-transitory computer readable medium may store instructions for partitioning the memory space to the multiple memory space subsets based upon expected or monitored memory access patterns.

The monitored memory access patterns may represent temperatures of the multiple memory space subsets; wherein a temperature of a memory space subset represents an access frequency to the memory space subset.

The multiple memory space subsets may differ from each other by their associated temperature ranges.

A device may be provided and may include a memory controller and a non-volatile memory device; wherein the memory controller may be arranged to receive data sectors; wherein each data sector belongs to a memory space subset out of multiple memory space subsets; wherein the multiple memory space subsets may include a plurality of logical memory blocks; wherein the memory space is partitioned to the multiple memory space subsets based upon expected or monitored memory access patterns; write each data sector into a data block that is allocated to a memory space subset that is associated with the data sector; wherein the data block belongs to a buffer of the non-volatile memory device; maintain a management data structure that may include location metadata about a location of each data sector in the buffer; and merge, if a criterion is fulfilled and before the buffer becomes full, data sectors stored at different data blocks and belong to a same set of logical memory blocks into a sequential portion of the non-volatile memory device, wherein the sequential portion differs from the buffer.

A method for memory management, the method may include receiving data sectors; wherein each data sector belongs to a memory space subset out of multiple memory space subsets; wherein the memory space is partitioned to the multiple memory space subsets based upon temperatures of a plurality of logical memory blocks included in the multiple memory space subsets; wherein a temperature of a logical memory block represents an access frequency to the logical memory block; writing each data sector into a data block that is allocated to a memory space subset that is associated with the data sector; wherein the data block belongs to a buffer set of the non-volatile memory device; wherein the buffer set may include at least one buffer; maintaining a management data structure that may include location metadata about a location of each data sector in the buffer set; and merging, if a criterion is fulfilled and before the buffer becomes full, data sectors stored at different data blocks and belong to a same set of logical memory blocks into a sequential portion of the non-volatile memory device, wherein the sequential portion differs from the buffer set.

The buffer set may include multiple buffers.

The multiple buffers may be associated with different temperature ranges.

The different temperature ranges may be non-overlapping.

The method may include allocating the logical memory blocks to the multiple buffers according to temperatures of the logical memory blocks.

The allocating of the logical memory blocks is responsive to a write amplification value associated with the non-volatile memory device.

The allocating of the logical memory blocks may include selecting an allocation, out of a set of allocations of logical memory blocks to the multiple buffers that exhibits a lowest write amplification value.

The method may include allocating for each buffer (Bi) of the multiple buffers a number (Ni) of logical memory blocks, wherein the number of logical blocks allocated to each buffer is responsive to (a) a sum (Pi) of temperatures of logical memory blocks allocated to the buffer, (b) a relative size (Ri) of the buffer, and (c) a number (Nnac) of logical memory blocks of the non-volatile memory device that may be not accessible to a user.

Ni may equal Nac multiplied by a ratio between (a) a square root of (Pi*Ri), and (b) a sum, over all buffers of a square root of (Pi*Ri).

The allocating of the logical memory blocks may include calculating for each allocation out of multiple allocations an allocation metric to provide multiple allocation metrics; wherein the multiple allocations differ from each other by a re-allocation of memory blocks of extremum temperatures; and selecting a selected allocation out of the multiple allocations in response to values of the multiple metrics.

A non-transitory computer readable medium may be provided that stores instructions that once executed by a memory controller cause the memory controller to receive data sectors; wherein each data sector belongs to a memory space subset out of multiple memory space subsets; wherein the memory space is partitioned to the multiple memory space subsets based upon temperatures of a plurality of logical memory blocks included in the multiple memory space subsets; wherein a temperature of a logical memory block represents an access frequency to the logical memory block; write each data sector into a data block that is allocated to a memory space subset that is associated with the data sector; wherein the data block belongs to a buffer set of the non-volatile memory device; wherein the buffer set may include at least one buffer; maintain a management data structure that may include location metadata about a location of each data sector in the buffer set; and merge, if a criterion is fulfilled and before the buffer becomes full, data sectors stored at different data blocks and belong to a same set of logical memory blocks into a sequential portion of the non-volatile memory device, wherein the sequential portion differs from the buffer set.

A device may be provided and may include a memory controller and a non-volatile memory device; wherein the memory controller may be arranged to receive data sectors; wherein each data sector belongs to a memory space subset out of multiple memory space subsets; wherein the memory space is partitioned to the multiple memory space subsets based upon temperatures of a plurality of logical memory blocks included in the multiple memory space subsets; write each data sector into a data block that is allocated to a memory space subset that is associated with the data sector; wherein the data block belongs to a buffer set of the non-volatile memory device; wherein the buffer set may include at least one buffer; maintain a management data structure that may include location metadata about a location of each data sector in the buffer set; and merge, if a criterion is fulfilled and before the buffer becomes full, data sectors stored at different data blocks and belong to a same set of logical memory blocks into a sequential portion of the non-volatile memory device, wherein the sequential portion differs from the buffer set.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 19 illustrates a stage of the method of FIG. 18 according to an embodiment of the invention;

Figure 1:
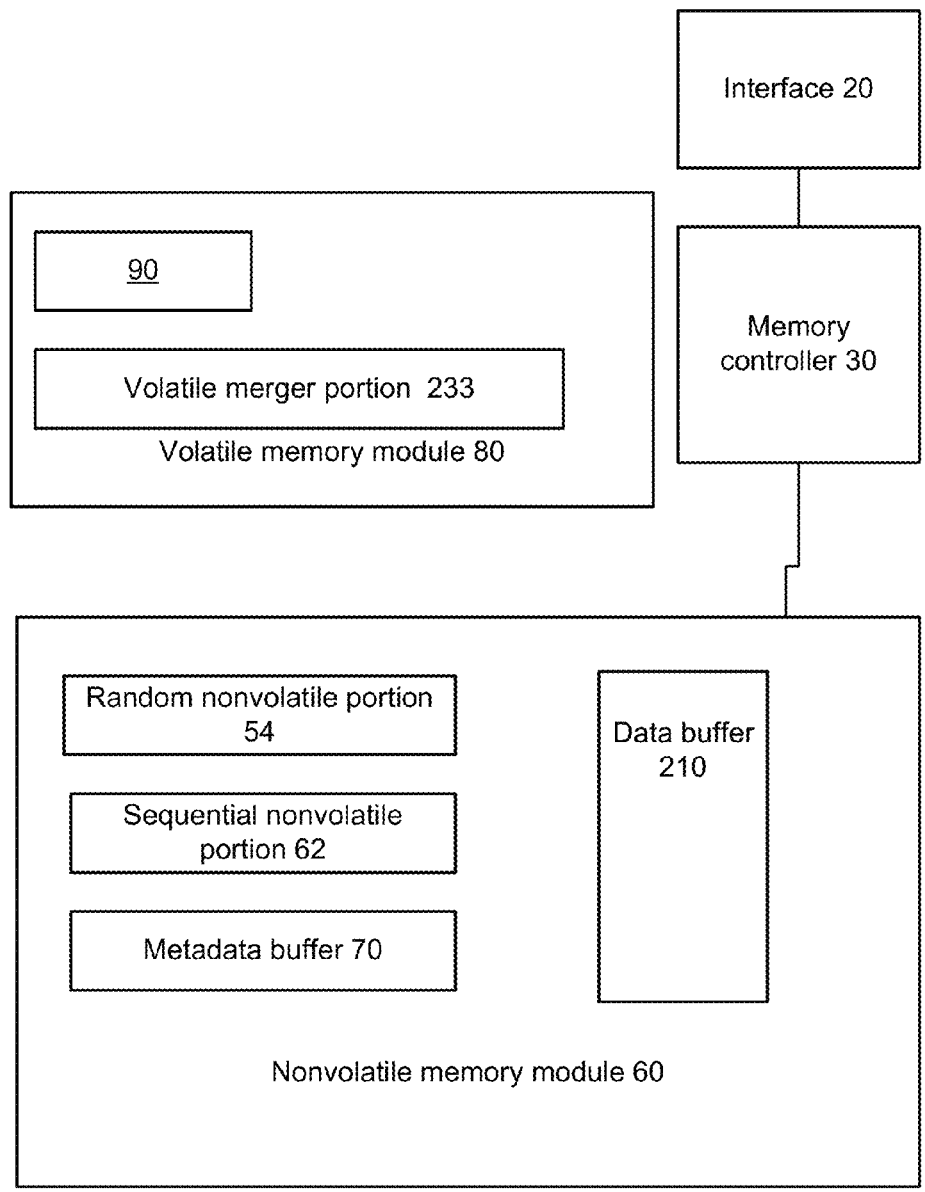
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

U.S. patent application Ser. No. 13/434,083, filing date Mar. 29 2012, titled "SYSTEM AND METHOD FOR FLASH MEMORY MANAGEMENT", which is incorporated herein by reference, teaches of an extended random sector buffer (ERSB) which is used in Flash storage systems employing block mapping to mitigate the need to perform block merge for every input sector, when writing a sequence of sectors to random logical addresses. The ERSB is a collection of auxiliary data blocks, which hold short write transactions until a later stage when the data of these transactions are merged to their original logical blocks. When writing short random transactions, the transactions are written contiguously to some ERSB data block. A special data base maps each physical page in the ERSB to a corresponding logical page. When the ERSB becomes full, block merges are initiated for all logical blocks present in the ERSB until the data blocks are freed and new sectors can be written to the ERSB.

It is especially instructive to consider the IOPS behavior of the ERSB system when writing a sequence of write transactions where each write consists of one data sector (e.g., 512 B) or segment (e.g., 4 KB) and where the address of each write transaction is randomly chosen from some test area which is some subset of the user space. In this situation, all transactions are performed initially to the ERSB. Initially, the throughput achieved for these writes is relatively high and is determined primarily by the write speed, which is supported by the flash array. As the ERSB becomes close to full, it is necessary to vacate some of its blocks. Since each data block in the ERSB can potentially have pages from all the logical blocks in the test area, in order to vacate even a single data block, it is required to merge a very large population of the logical blocks. The merges require a substantial amount of time, rendering the throughput to be much lower during this time. This situation continues until at least one data block is freed, and then high throughput is restored again.

FIG. 1 illustrates a system 10 according to embodiments of the invention. System 10 includes an interface 20 that may be linked to a memory controller 30 and may be linked to a nonvolatile memory module 60 and a volatile memory module 80.

The nonvolatile memory module 60 may contain a random portion 54, a sequential portion 62, a data buffer 210 and a metadata buffer 70.

The random portion may refer to a logically allocated random portion memory, while the sequential portion may refer to a logically allocated sequential portion memory. The metadata buffer 70 and other management portions may be allocated within the nonvolatile memory module 60. In FIG. 1 some data structures such as the metadata buffer 70 may be illustrated as being contained outside the random portion 54 or sequential portion 62, although these structures may be contained within nonvolatile memory. It is noted that the data buffer 210 may be included in the random portion 54.

System 10 may store a management data structure that may store metadata about the content of the volatile memory module 80, the content of the nonvolatile memory module 60 or both memory modules. The management data structure can be stored at the volatile memory module 80 and, additionally or alternatively at the nonvolatile memory module 60.

FIG. 1 illustrates volatile memory module 80 and metadata buffer 70 as storing a management data structure 90 that includes location metadata (such as pointer) about a location of data sector in the data buffer 210.

FIG. 1 also illustrates a volatile merger portion 233 that can be used when data sectors are merged. Data sectors that were previously stored at the random portion can be merged before being written to the sequential portion. Additionally or alternatively, the merging can occur between data sectors from sequential and random portions. The merging may include copying data sectors to be merged to volatile merger portion 233 and then writing the merged data sectors to the sequential portion.

Figure 2:
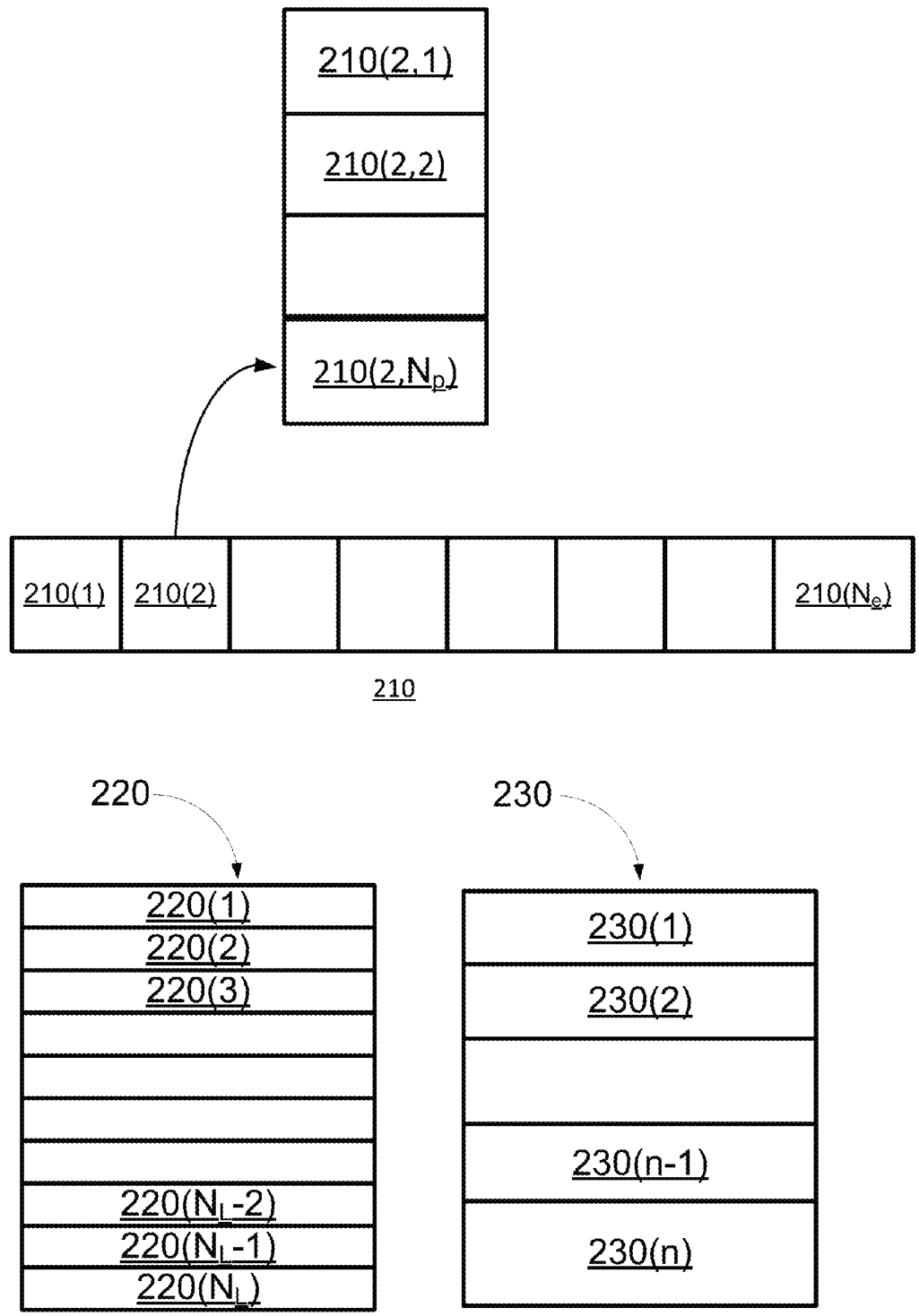
FIG. 2 illustrates data structures according to an embodiment of the invention.

FIG. 2 depicts the content of data buffer 210. Data buffer 210 includes Ne data blocks 210(1)-210(Ne). Each data block may include multiple pages (data block 210(2) is illustrated as including Np data pages 210(2,1)-210(2,Np)). Each page may store one or more data sectors.

A logical memory space (such as a user space) 220 may include multiple (NO logical memory blocks (LBAs) 220(1)-220(NL) and may be partitioned to multiple (n) memory subsets —230(1)-230($n$).

FIG. 2 illustrates a memory space and a buffer that are characterized by the following parameters:

$N_p$—Number of (4 KB) pages (segments) in a physical block $N_L$—Number of logical blocks (LBAs)

$N_e$—Number of ERSB data blocks f—Number of merge fragments (or transaction timeout durations) required to complete a block merge $t_w$—Page write duration [sec]

$t_m$—Merge duration [sec]

For the system in FIGS. 1 and 2, the average IOPS performance is given by Average *IOPS* when using prior art *ERSB*

$$IOPS = \frac{(N_e - G)N_p}{(N_e - G)N_p t_w + N_L t_m}; G = \left\lceil \frac{fN_L}{N_p} \right\rceil \quad \text{Equation 1}$$

Figure 3:
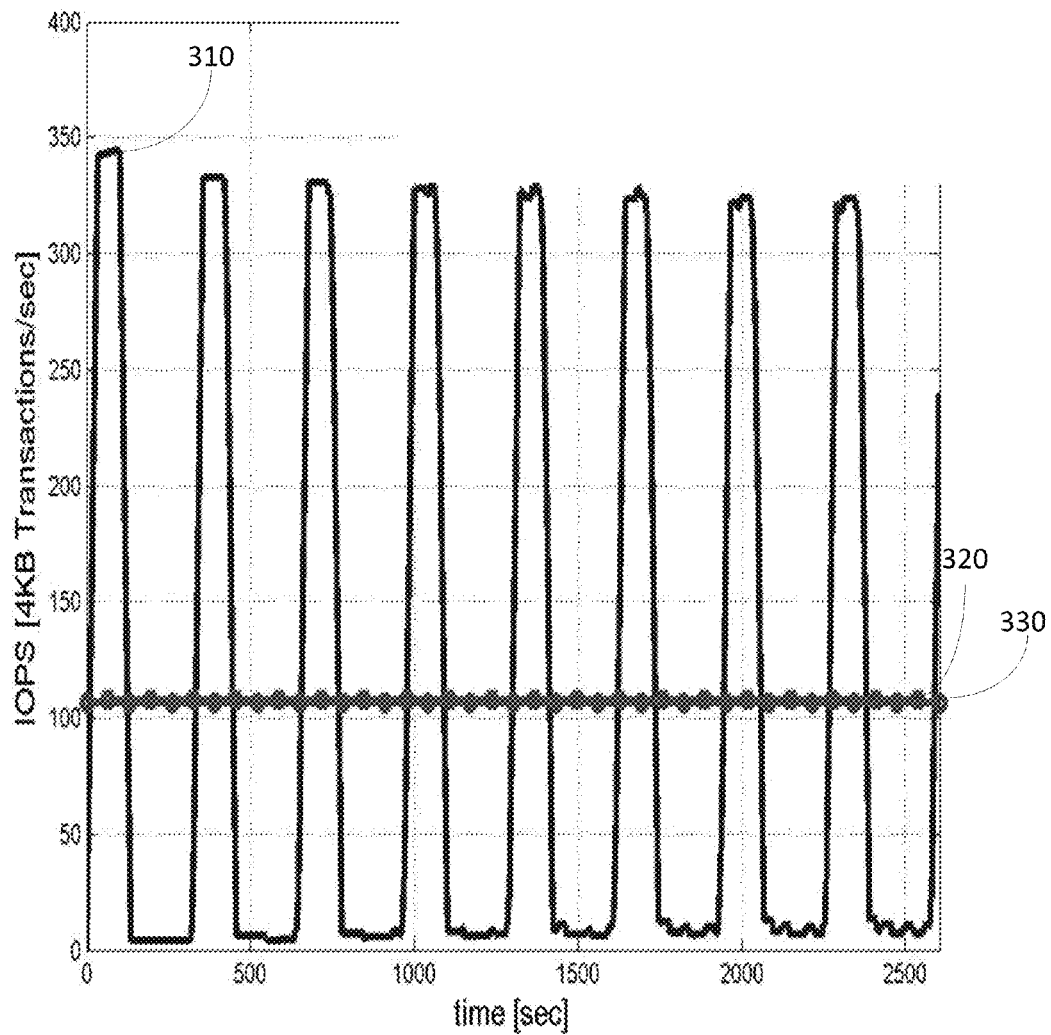
FIG. 3 illustrates the performance of a system according to an embodiment of the invention.

FIG. 3 shows the IOPS performance of a representative ERSB system employing a prior art management scheme with $N_p$=600, $N_L$=240, $N_e$=60, f=5, $t_w$=0.001 [sec], and $t_m$=1.2 [sec]. Instantaneous IOPS (curve 310) are the number of 4 KB pages written to the ERSB per second at each time instant (averaged over a 100 sec time window). Theoretical average IOPS (curve 320) are the average number of 4 KB pages written to the ERSB per second as predicted by Equation 1. Empirical average IOPS (curve 330) are the average number of 4 KB pages written to the ERSB per second over the entire time duration as measured in the representative ERSB system.

The suggested methods seek to increase the average IOPS performance of an ERSB system, and to maintain as much as possible a steady level of instantaneous IOPS.

Splitting the User Space into 2 User Space Subsets

One embodiment of the present invention seeks to increases the average IOPS performance of an ERSB system by partitioning the user space into 2 disjoint user subsets (E.g., user subset A and user subset B). A user subset is a collection of logical pages belonging to the user space. The user space is the collection of all the logical pages in the storage system. At each time instant, 2 ERSB data blocks may be open for writing, data block A and data block B, which are associated with user space subset A and user space subset B, respectively.

The partitioning can be done in an arbitrary manner or based upon expected or monitored memory access patterns. It may be beneficial that the user utilizes all memory space subsets at the same manner (or at the same quantity)—in order to benefit from the partitioning. The subsets can be of the same size or differ from each other by size. Each subset can include a continuous range or addresses or not. For example—the memory space subsets can include interleaving addresses.

Figure 4:
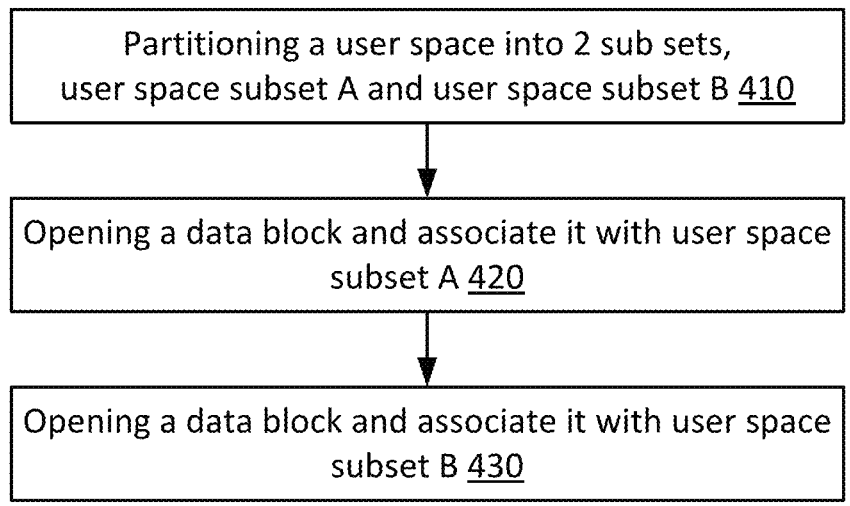
FIG. 4 illustrates a method according to an embodiment of the invention.

FIG. 4 includes a flow chart implementing this procedure. Method 400 of FIG. 4 includes the following stages: Partitioning (410) a user space into 2 subsets—user space subset A and user space subset B; Opening (420) a data block and associate it with user space subset A; and Opening (430) a data block and associate it with user space subset B.

Short random transactions may then be written to the ERSB as follows. Each transaction may be written to the ERSB block corresponding to the user space subset to which the transaction belongs. A transaction destined to an address belonging to set A (respectively B) may be written to ERSB data block A (respectively B). Once an ERSB block associated to some user space subset becomes full, a free ERSB block may be allocated and associated with the said user space subset.

Once the ERSB becomes close to full, i.e. the number of free blocks becomes less than some threshold T, a sequence of block merges may be initiated as follows. The user space subset for which the number of associated ERSB blocks is maximal may be chosen, and all LBAs in that user space subset may then be merged. While the merges are performed, new incoming pages may be written to their corresponding data blocks. The buffer is organized as a collection of 4 KB segments (or pages). Data sectors, which arrive from the host, are grouped into pages before written to the buffer. Any reference to a "page" can be referred to a reference to a "data sector" and vice verse. The merges may continue until some or all of the ERSB data blocks are emptied. The threshold T may be chosen as some function of f, $N_L$, and $N_p$. This function may be chosen as $$T = \left\lceil \frac{fN_L}{2N_p} \right\rceil + 1.$$

The addition of "+1" is aimed to protect against the following worst case scenario. Assume that just after the number of free blocks becomes smaller than T, one of the remaining blocks is allocated to one of the sets, but all superseding writes are done to the other user space subset. In this case, even though there were T blocks left, one of the blocks is not being used because all the traffic is directed to the other set.

Figure 5:
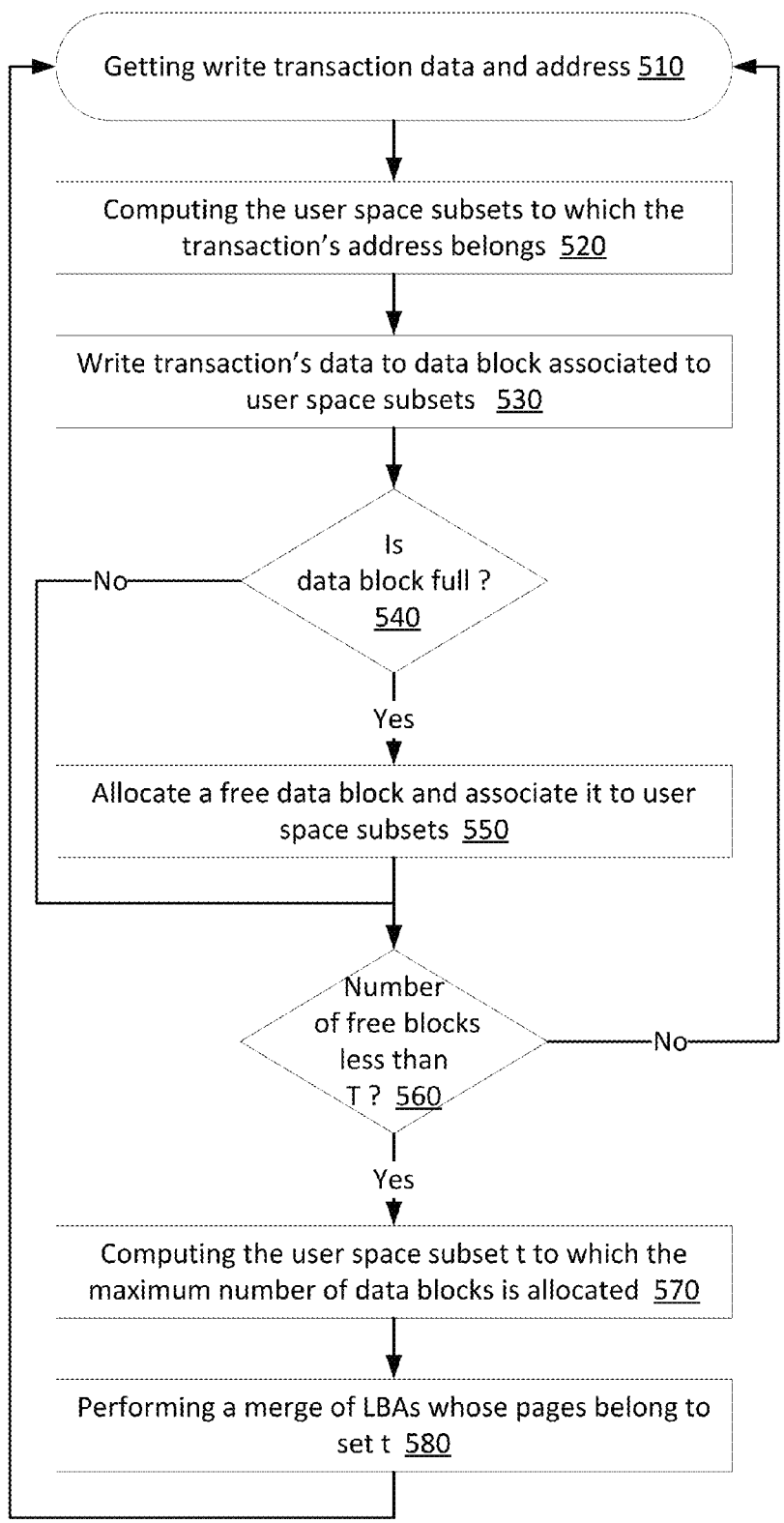
FIG. 5 illustrates a method according to an embodiment of the invention.

FIG. 5 includes a flow chart implementing the above procedure.

Method 500 of FIG. 5 may start by stage 510 of getting a write transaction data and address. Stage 510 may be followed by stage 520 of computing the user space subset to which the transaction's address belongs. Stage 520 may be followed by stage 530 of writing transaction's data to data block associated to user space subset. Stage 530 may be followed by stage 540 of checking if the data block is full. If so—jumping to stage 550 of allocating a free data block and associate it to user space subsets. Else—jumping to stage 560. Stage 550 may be followed by stage 560 of checking if the number of free blocks is less than T If no—jumping to stage 510. If yes—jumping to stage 570 of computing the user space subset t to which the maximum number of data blocks is allocated. Stage 570 may be followed by stage 580 of performing a merge of LBAs whose pages belong to set t and jumping to stage 510. For the ERSB system in FIG. 1, the average IOPS performance when performing LBA splitting to 2 user space subsets may approximately be given by Average *IOPS* when splitting user space to 2 subsets $$IOPS_{SPLT(2)} = \frac{\frac{2}{3}(N_e - G)N_p}{\frac{2}{3}(N_e - G)N_p t_w + \frac{1}{2}N_L t_m}; G = \left\lceil \frac{fN_L}{2N_p} \right\rceil + 2 \quad \text{Equation 2}$$

Figure 6:
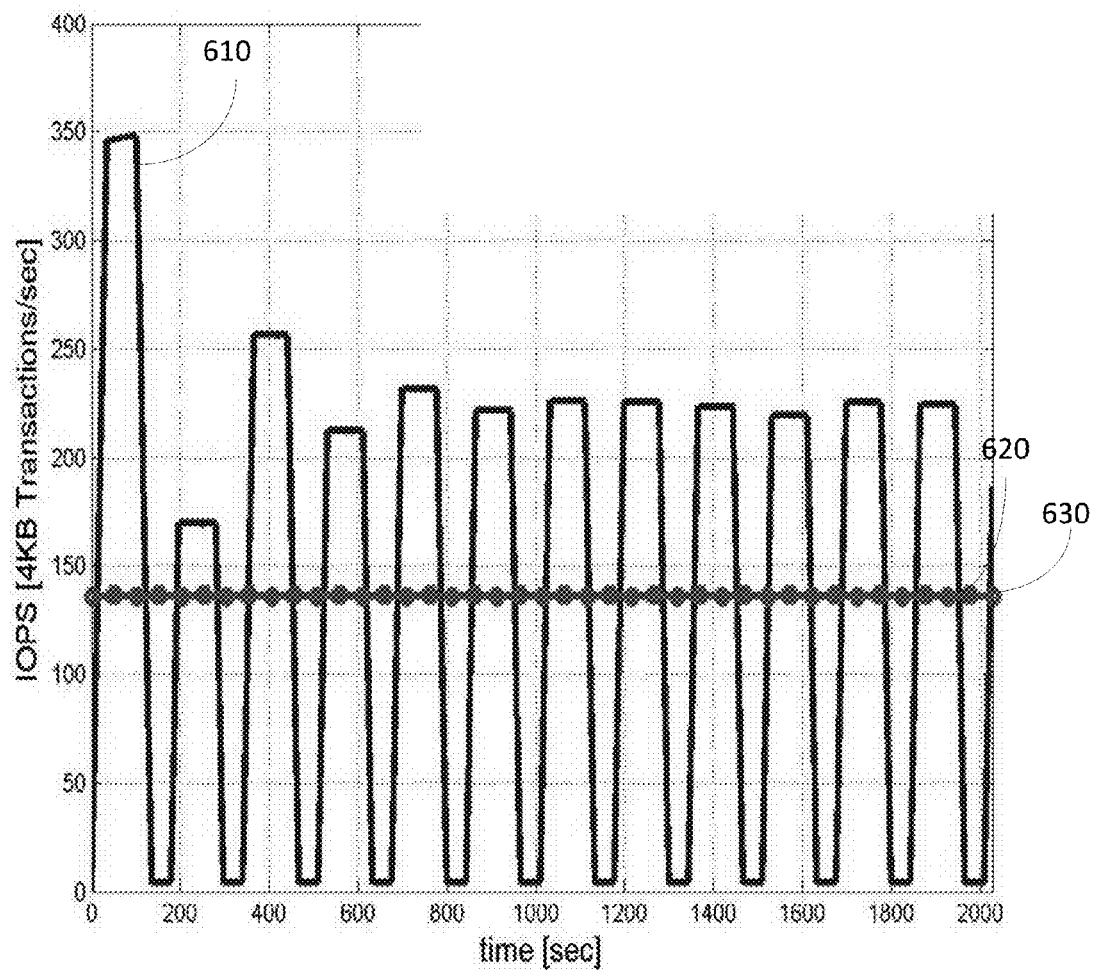
FIG. 6 illustrates the performance of a system according to an embodiment of the invention.

FIG. 6 shows the IOPS performance of a representative ERSB system employing user space splitting to 2 subsets with $N_p$=600, $N_L$=240, $N_e$=60, f=5, $t_w$=0.001 [sec], and $t_m$=1.2 [sec]. Instantaneous IOPS (curve 610) are the number of 4 KB pages written to the ERSB per second at each time instant. Theoretical average IOPS (curve 620) are the average number of 4 KB pages written to the ERSB per second as predicted by Equation 2. Empirical average IOPS (curve 630) are the average number of 4 KB pages written to the ERSB per second over the entire time duration as measured in the representative ERSB system.

Splitting the User Space into n User Space Subsets

Another embodiment of the present invention seeks to increases the average IOPS performance of an ERSB system even further by partitioning the user space into n disjoint, equal-sized user space subsets (E.g., subset $A_1$, subset $A_2$, ..., subset $A_n$). At each time instant, n ERSB data blocks may be open for writing, data blocks $A_1, A_2, \ldots,$ and $A_n$, which are associated with user space subsets $A_1, A_2, \ldots,$ and $A_n$, respectively.

Figure 7:
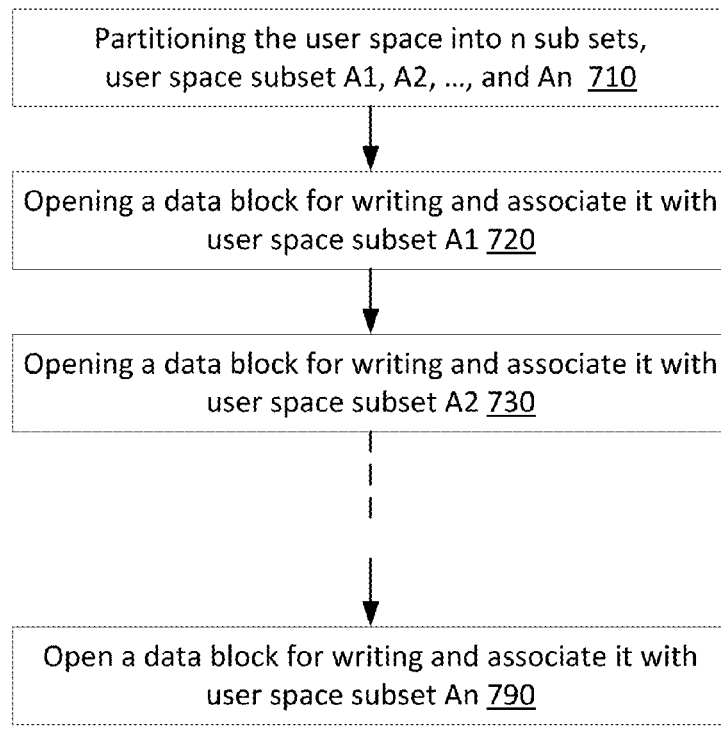
FIG. 7 illustrates a method according to an embodiment of the invention.

FIG. 7 includes a flow chart implementing this procedure. Method 700 of FIG. 7 includes stages 710, 720, 730, and 790.

Stage 710 of partitioning the user space into n sub sets, user space subset A1, A2, ..., and An.

Stage 720 of opening a data block for writing and associate it with user space subset A1.

Stage 730 of opening a data block for writing and associate it with user space subset A2.

Stage 790 of Open a data block for writing and associate it with user space subset An.

Short random transactions may be then written to the ERSB as follows. Each transaction may be written to the ERSB block corresponding to the user space subset to which the transaction belongs. A transaction destined to a logical address belonging to user space subset $A_k$ is written to ERSB data block $A_k$.

Once an ERSB block associated to some user space subset becomes full, a free ERSB block may be allocated and associated with the said user space subset. The data blocks associated with some user space subset (not including the block, which is open for writing) are called an ERSB sub pool.

Once the ERSB becomes close to full, i.e. the number of free blocks becomes less than some threshold T, a sequence of block merges may be initiated as follows. The user space subset for which the number of associated ERSB blocks is maximal may be chosen, and all LBAs in that user space subset may then be merged. While the merges are performed, new incoming pages may be written to their corresponding data blocks. The merges may continue until some or all of the ERSB data blocks are emptied. The threshold T may be chosen as some function of f, $N_L$, and $N_p$. This function may be chosen as $$T = \left\lceil \frac{fN_L}{nN_p} \right\rceil + n - 1.$$

The addition of "n−1" is aimed to protect against the following worst case scenario. Assume that just prior to the time when the number of free blocks becomes equal to T, all open ERSB blocks have all pages written in them except perhaps for a single page. At the next page write, one of the blocks may become full and a new block will be allocated to it, rendering the number of free blocks less than T, and causing the merges sequence of the corresponding user space subset to commence. Since n−1 ERSB blocks might cause a new block allocation during the following page writes, we must add these to the gap calculation. FIG. 4 includes a flow chart implementing the above procedure.

For the ERSB system in FIG. 1, the average IOPS performance when performing splitting of the user space into n user space subsets may be approximately given by Average *IOPS* when splitting user space to *n* subsets $$IOPS_{SPLT(n)} = \frac{\frac{2}{n+1}(N_e - G)N_p}{\frac{2}{n+1}(N_e - G)N_p t_w + \frac{1}{n}N_L t_m};$$ Equation 3

$$G = \left\lceil \frac{fN_L}{nN_p} \right\rceil + 2(n-1)$$

Equation 3 is explained by considering the steady state behavior of the ERSB system. Specifically, denote by $K_1, K_2, \ldots, K_n$ the number of data blocks allocated to each ERSB sub pool. Next, denote by $N_1, N_2, \ldots, N_n$ the ordering of the sequence $K_1, K_2, \ldots, K_n$ from largest to smallest. Finally, denote by $$a_j = \frac{N_j}{N_e - G}, 1 \le j \le n$$

the fractions of ($N_e$–G) ERSB blocks allocated to each ERSB sub pool. Whenever the number of free ERSB blocks falls below the threshold, the LBAs belonging to the largest ERSB sub pool are merged, causing the freeing of a fraction $a_1$ of the total ($N_e$–G) ERSB allocated data blocks. Following the merge, and until the next time that the free block threshold is reached, theses free blocks are evenly distributed among all ERSB sub pools. It follows that whenever the threshold is reached, each fraction is increased by $$\frac{a_1}{n},$$

except for the one which is vacated, and which becomes just $$\frac{a_1}{n}.$$

In other words

Fractions of *ERSB* blocks in each *ERSB* pool in steady state $$(a_1, a_2, \ldots, a_n) = \left(n\frac{a_1}{n}, (n-1)\frac{a_1}{n}, (n-2)\frac{a_1}{n}, \ldots, \frac{a_1}{n}\right)$$ Equation 4

Finally, summing all terms to unity on the right hand side of Equation 4 yields $$a_1 = \frac{2}{n+1}.$$

It follows that every time the ERSB becomes full, $$\frac{2}{n+1}(N_e - G)$$

data blocks are vacated by merging $$\frac{1}{n} N_L$$

LBAs. In other words, for each $$\frac{2}{n+1}(N_e - G)$$

data blocks, which are written, $$\frac{1}{n} N_L$$

LBAs must be merged. This relation implies Equation 3
Optimizing the Value of n

Figure 8:
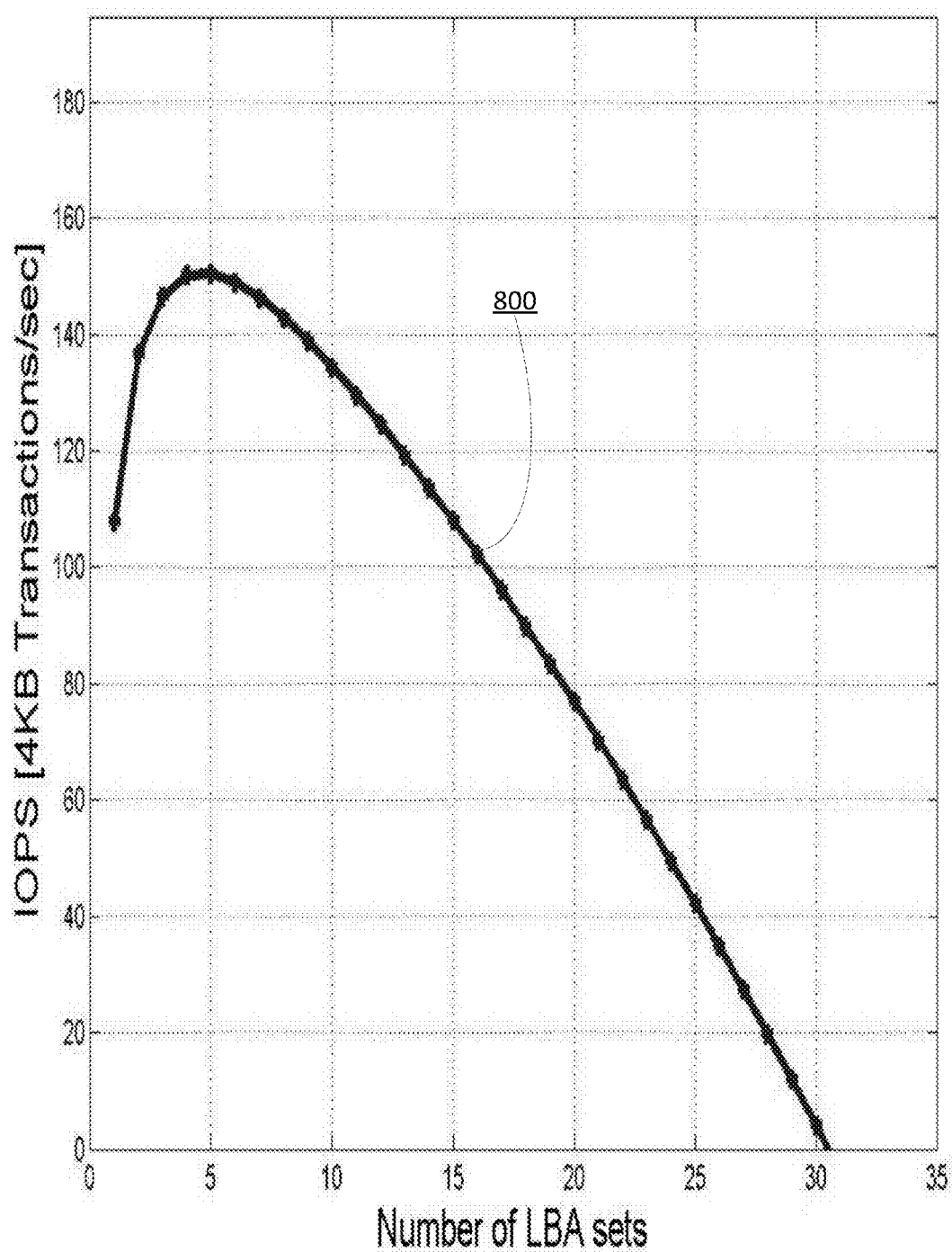
FIG. 8 illustrates the performance of a system according to an embodiment of the invention.

FIG. 8 depicts the IOPS performance of the representative ERSB system (curve 800) employing splitting of the user space into n user space subsets as function of the splitting parameter n with $N_p$=600, $N_L$=240, $N_e$=60, f=5, $t_w$=0.001 [sec], and $t_m$=1.2 [sec]. It can be seen that the average IOPS performance grows with n up to a certain point, and then begins to drop. The reason for this behavior is that there are two contradicting factors governing the IOPS expression. The first is the ratio between the amount of data written to the ERSB between two consecutive merge phases and between the time required to merge all the LBAs which belong to the appropriate LBA set, and the second is the amount of gap (G) required to support the ERSB from exhausting all of its free blocks and having nowhere to write incoming data. When n begins to grow, the first term is more dominant, hence the gain which is achieved grows with n. However, as n continues to grow, the second term becomes increasingly more dominant, and the increasing gap reduces the effective size of the ERSB, causing a decrease in IOPS performance. Per a given system and its parameters, it is possible to find numerically the optimal value of n, and optimize the IOPS gain by using this approach. This may be achieved by computing the expression in Equation 3 for all values of $n \leq N_e$ and choosing the value of n for which the result is maximum.

Achieving Increased Average IOPS Performance while Maintaining Constant Instantaneous IOPS Performance by Combining Merging and Cleaning One embodiment of the present invention seeks to increase the average IOPS performance while maintaining a constant instantaneous IOPS performance, by employing a procedure called LBA cleaning and combining it with merging. Cleaning of an LBA in the ERSB may refer to a procedure in which all the pages belonging to the said LBA and residing in one or more data blocks in the ERSB are copied to the currently opened data block in the ERSB and marked as superseded in the data block from which they were copied. In this scheme, all data blocks may contain pages from all LBAs. At each time instant, however, only a single data block may be open for writing. Once a data block is complete (i.e., all of its data pages have been written), a quantity $$X_n = (1 - \alpha) \frac{N_L}{N_e}$$

and a quantity $$Y_n = \alpha \frac{N_L}{N_e}$$

may be computed. Then, a quantity $M_n$ of LBAs may be merged and a quantity $C_n$ of LBAs may be cleaned, where $M_n = f(X_n, X_{n-1}, \ldots, X_1)$ and $C_n = g(Y_n, Y_{n-1}, \ldots, Y_1)$.

In one embodiment of the invention, the functions f and g are the same.

In one embodiment of the invention, the functions f and g are the same and $M_n = f(X_n, X_{n-1}, \ldots, X_1)$ is defined as follows. Let $\Psi_0 = 0$. For each $n \geq 1$, $M_n = \lfloor_{n-1} + X_n \rfloor$ and $\Psi = \Psi_{n-1} + X_n - M_n$.

In one embodiment of the invention, LBAs are chosen for merging and cleaning in a round-robin fashion. For example, assume the LBAs in the system are denoted by $LBA_0$, $LBA_1, \ldots, LBA_{N-1}$. Assume further that at some point in time immediately after a data block was complete, the last LBA which had been either merged or cleaned is $LBA_{\pi(x)}$ and that $M_n$=m and $C_n$=c. Then, $LBA_{\pi((x+1)\% N)}$, $LBA_{\pi((x+2)\% N)}$, $LBA_{\pi((x+m)\% N)}$ may be chosen for merge and $LBA_{\pi((x+m+1)\% N)}$, $LBA_{\pi((x+m+2)\% N)}$, ..., $LBA_{\pi((x+m+c)\% N)}$ may be chosen for cleaning, where $\pi(\bullet)$ is an arbitrary fixed permutation on the logical blocks. If one of the LBAs chosen for cleaning has never been merged since it had last been cleaned, then it is skipped. For example, if $LBA_{\pi((x+m+k)\% N)}$ has never been merged since it had last been cleaned, the LBAs chosen for cleaning may be $LBA_{\pi((x+m+1)\% N)}$, $LBA_{\pi((x+m+2)\% N)}$, ..., $LBA_{\pi((x+m+k-1)\% N)}$, $LBA_{\pi((x+m+k+1)\% N)}$, ..., $LBA_{\pi((x+m+k+2)\% N)}$, ..., $LBA_{\pi((x+m+c+1)\% N)}$.

Figure 9:
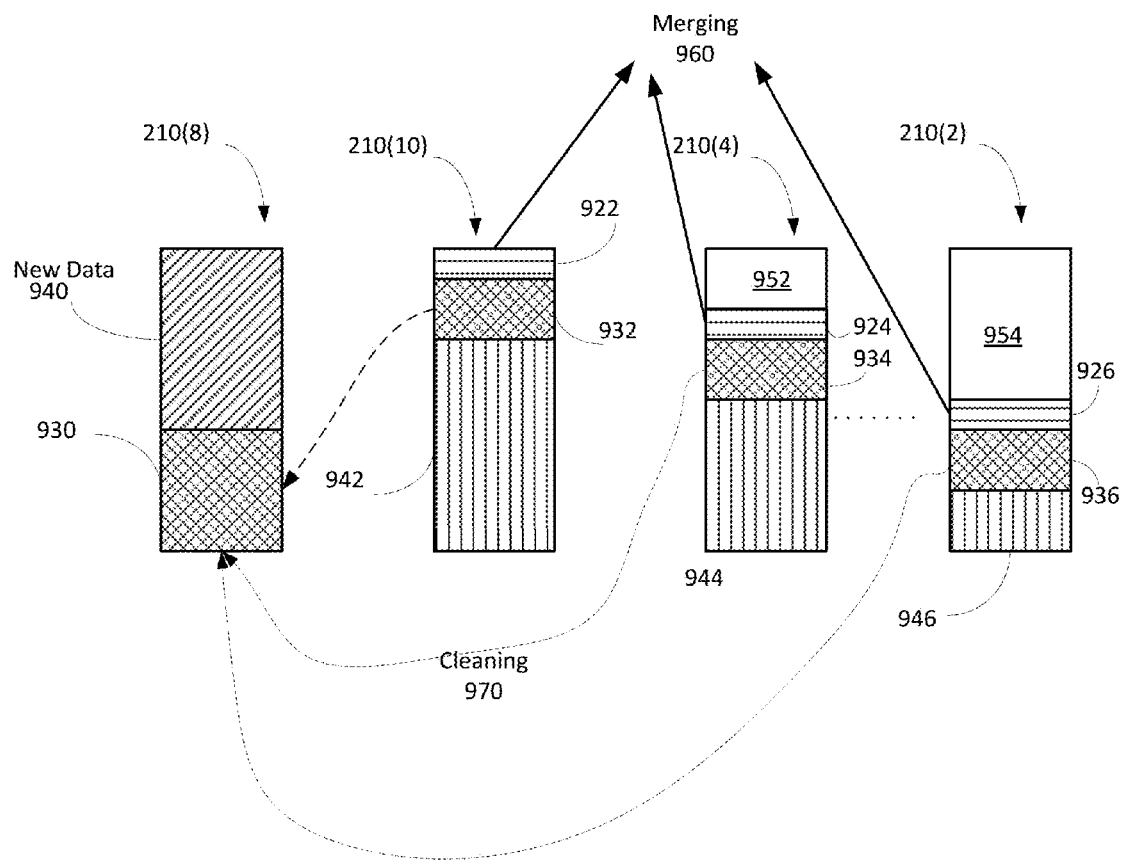
FIG. 9 illustrates cleaning and merging processes according to an embodiment of the invention.

FIG. 9 shows schematically the procedure, which may be employed whenever a new data block is opened for writing. Whenever a new data block (210(8)) is opened for writing, some pages (922, 924 and 926) from each completed data block (210(10), 210(4) and 210(2)) are merged (denoted by "merging 960") to their corresponding LBAs, and other pages (932, 934 and 936) are copied during a cleaning process (970) to the new data block. New incoming data 940 is then written to the new data block until it is complete. The data blocks 210(10), 210(4) and 210(2) still maintain data sectors 942, 944 and 946 after the merging and cleaning—and these data sectors can be copied to the new data block in order to empty the data blocks.

Figure 10:
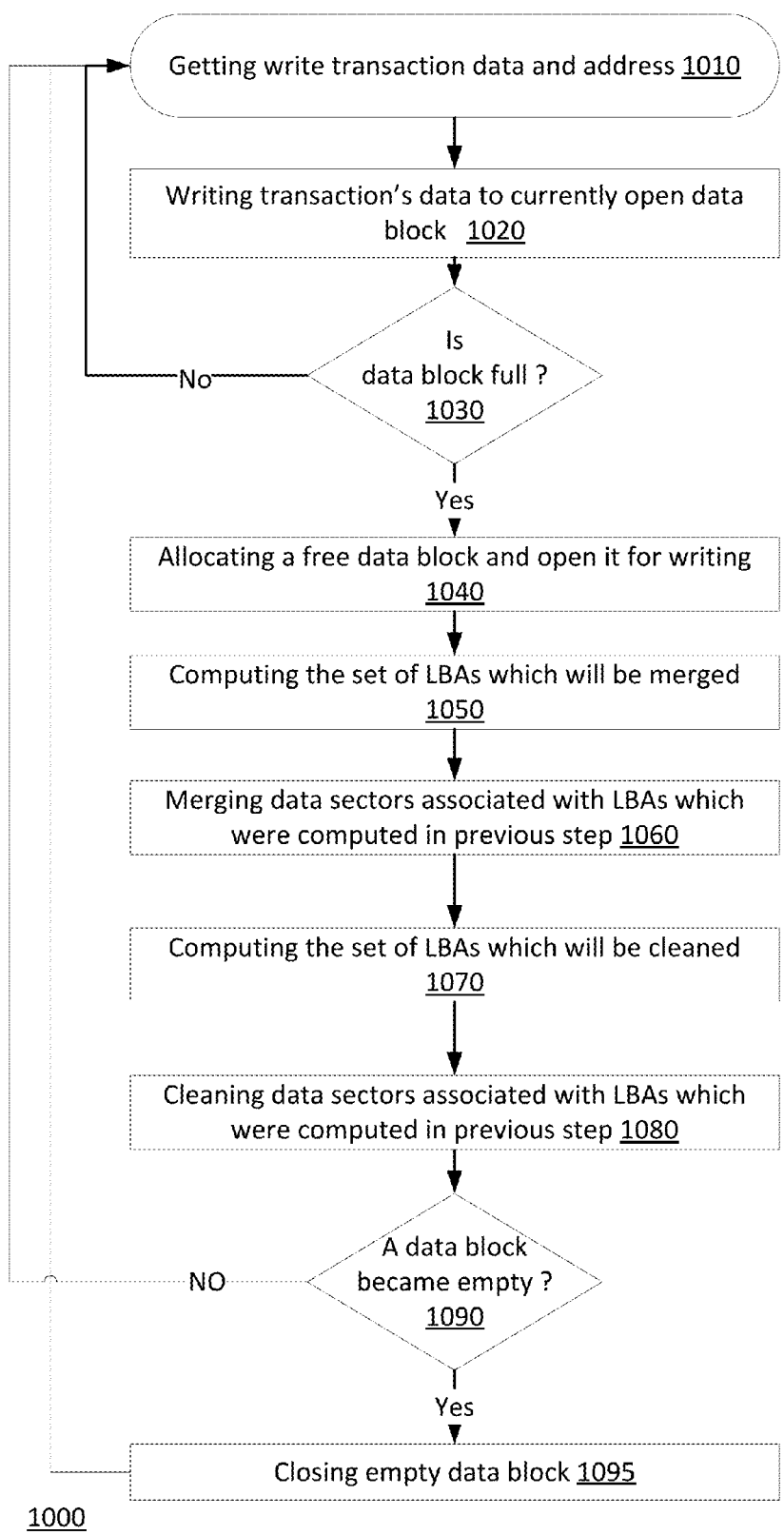
FIG. 10 illustrates a method according to an embodiment of the invention.

FIG. 10 includes a flow chart implementing the above embodiment.

Method 1000 of FIG. 10 may include the following stages:

Stage 1010 of getting write transaction data and address.

Stage 1020 of writing transaction's data to currently open data block.

Stage 1030 of checking if a data block full ? if 'No' back to stage 1010.

Stage 1040 of allocating a free data block and open it for writing.

Stage 1050 of computing the set of LBAs which will be merged.

Stage 1060 of merging data sectors associated with LBAs which were computed in previous step.

Stage 1070 of computing the set of LBAs which will be cleaned.

Stage 1080 of cleaning data sectors associated with LBAs which were computed in previous step.

Stage 1090 of checking if a data block became empty ? If 'No' back to stage 1010.

Stage 1095 of closing empty data block. Back to stage 1010.

Figure 11:
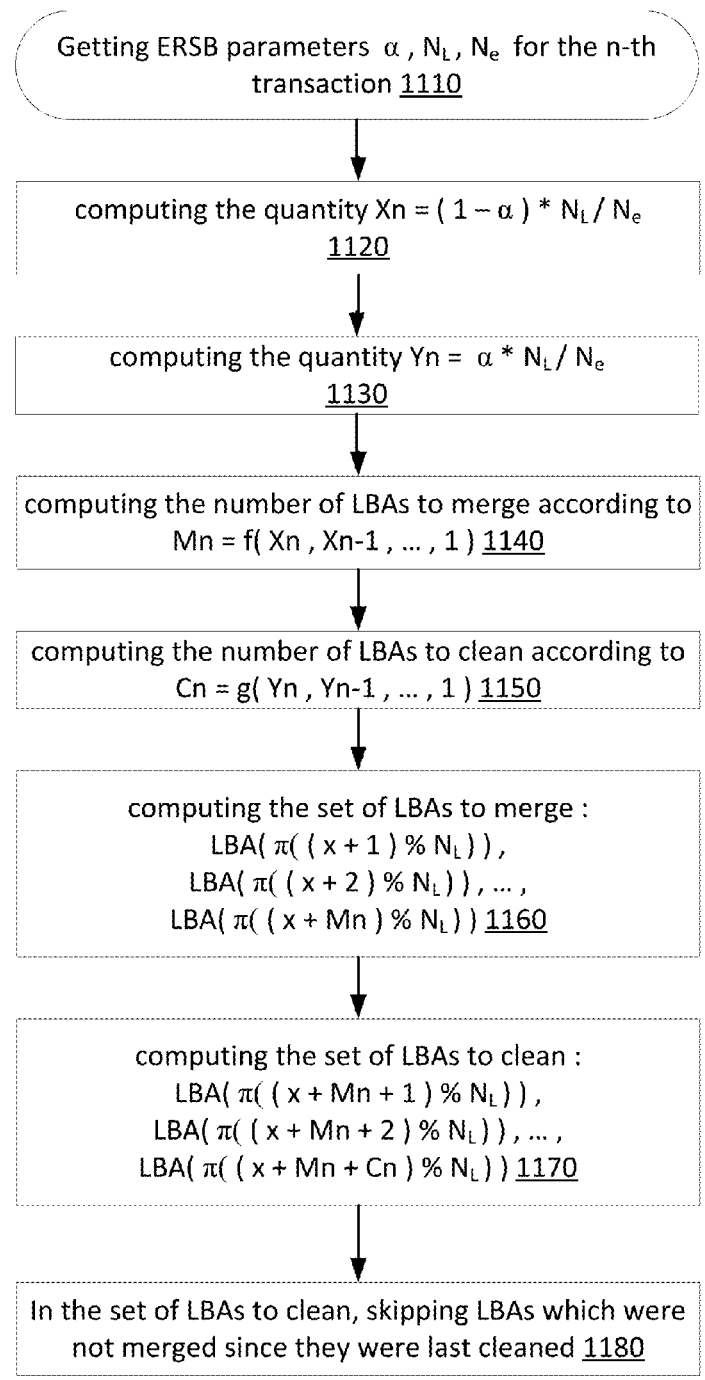
FIG. 11 illustrates a method according to an embodiment of the invention.

FIG. 11 includes a flow chart for computing the set of LBAs, which will be merged, and the set of LBAs that will be cleaned.

Method 1100 of FIG. 11 may include the following stages:

Stage 1110 of getting ERSB parameters $\alpha$, NL, Ne for the n-th transaction.

Stage 1120 of computing the quantity Xn=$(1-\alpha)$*NL/Ne.

Stage 1130 of computing the quantity Yn=$\alpha$*NL/Ne.

Stage 1140 of computing the number of LBAs to merge according to Mn=f(Xn, Xn–1, . . . , 1).

Stage 1150 of computing the number of LBAs to clean according to Cn=g(Yn, Yn–1, . . . , 1).

Stage 1160 of computing the set of LBAs to merge: LBA($\pi$((x+1) % NL)), LBA($\pi$((x+2)% NL)), . . . , LBA($\pi$((x+Mn) % NL)).

Stage 1170 of computing the set of LBAs to clean: LBA($\pi$((x+Mn+1) % NL)), LBA($\pi$((x+Mn+2)% NL)), . . . , LBA($\pi$((x+Mn+Cn) % NL)).

Stage 1180 of In the set of LBAs to clean, skipping LBAs which were not merged since they were last cleaned.

Figure 12:
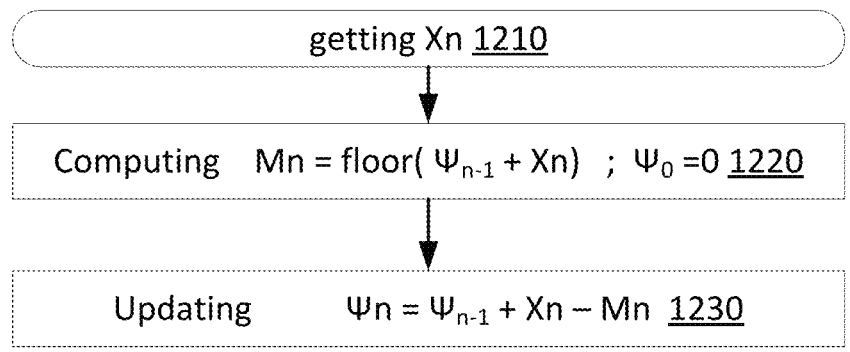
FIG. 12 illustrates a method according to an embodiment of the invention.

FIG. 12 includes a flow chart for implementing a building block required for implementing the flow chart in FIG. 11.

Method 1200 of FIG. 12 may include the following stages:

Stage 1210 of getting Xn.

Stage 1220 of Computing Mn=floor($\Psi$n–1+Xn); $\Psi$0=0.

Stage 1230 of Updating $\Psi$n=$\Psi$n–1+Xn–Mn.

For the ERSB system in FIG. 1, the average IOPS performance when combining merging and cleaning may be approximately given by Average *IOPS* when combining merging and cleaning $$IOPS_{SH-CL} = \frac{\frac{1}{1+\alpha}(N_e - G)N_p}{(N_e - G)N_p t_w + (1-\alpha)N_L t_m}; G = \left\lceil \frac{fN_L}{N_p} \right\rceil \quad \text{Equation 5}$$

Equation 5 is explained by considering the steady state behavior of the ERSB system employing this embodiment. Denote by x the fraction of the data block, which is written with pages from the remaining data blocks during the cleaning process. Since LBAs are chosen in a round robin fashion, and since no LBA is chosen for cleaning unless it has been merged after, it had last been cleaned, it follows that at least a fraction of x from all other ERSB data blocks does not contain any pages from the LBAs currently chosen for cleaning. Therefore, $$\alpha \frac{N_p}{N_e}(1-x)$$

pages are copied from each ERSB data block to the new data block. Equating the number of cleaned pages in the new data block x$N_p$ to the aggregate number of pages copied from all ERSB data blocks yields the relation $$x = \frac{\alpha}{1+\alpha}$$

Finally, the IOPS may be given by considering the number of newly written pages $(1-x)N_p$, and the time required for writing these pages. This time includes writing the entire data block plus the time needed for LBA merge. By substituting $\alpha$ into the resulting expression Equation 5 is obtained.

Figure 13:
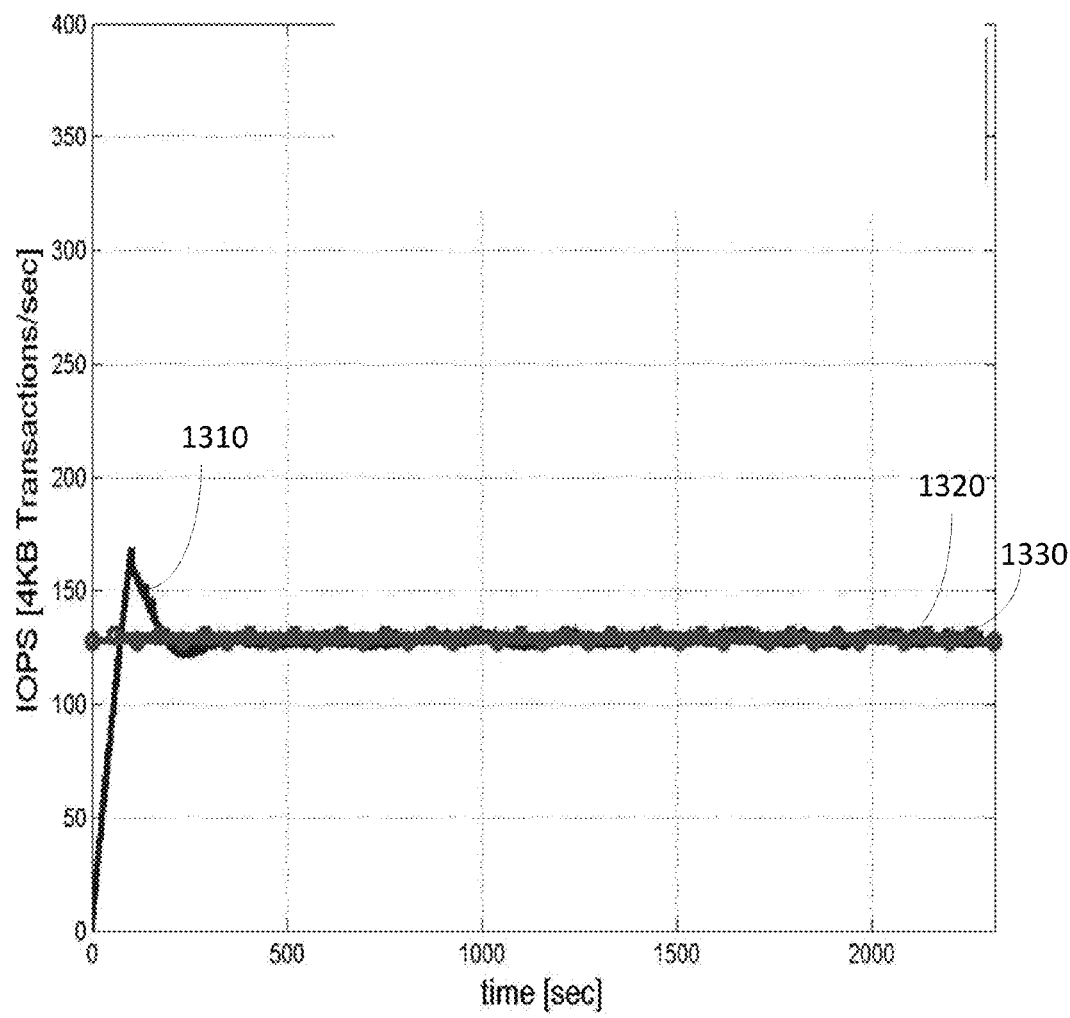
FIG. 13 illustrates the performance of a system according to an embodiment of the invention.

FIG. 13 depicts the IOPS performance (curve 1310) of the representative ERSB system employing combining merging and cleaning according to a certain embodiment of the invention with $N_p$=600, $N_L$=240, $N_e$=60, f=5, $t_w$=0.001 [sec], $t_m$=1.2 [sec], and $\alpha$=0.5. The skilled reader may observe the gain of this scheme w.r.t. prior art in terms of increased average IOPS performance and constant instantaneous IOPS performance. FIG. 13 also illustrates theoretical average IOPS (curve 1320) and empirical average IOPS (curve 1330).

In one embodiment of the present invention, the LBAs are chosen for merge according to the number of pages from each LBA, which reside in the ERSB and/or the time, which passed since the first page of each LBA entered the ERSB. For example, LBAs which have more pages in the ERSB and which reside in the ERSB for a longer period of time are merged sooner than others.

In one embodiment of the present invention, LBAs are chosen for cleaning according to the number of pages from each LBA, which reside in the ERSB and on the time, which passed since the first page of each LBA entered the ERSB.

In one embodiment of the invention, LBAs are chosen for cleaning according to their previous merge/clean history. For example, an LBA may not be chosen for cleaning if it had been chosen for cleaning for more than K times consecutively without being chosen for merge.

An additional element which can generalized the above merge-clean process may include both the LBA merge and LBA cleaning as mentioned above, but also ERSB data block copy. The idea is that a certain portion of LBAs is merged, another portion of LBA is cleaned, and then we are left with a number of data segments still lying in the ERSB data block that are copied to the new location, where the cleaned LBAs reside. By optimizing the ratios between the LBAs that are merged and cleaned the method can further optimize performance.

Achieving Increased Average IOPS Performance while Maintaining Constant Instantaneous IOPS Performance by Partitioning the ERSB to a Plurality of ERSBs Another embodiment of the present invention seeks to achieve an increased average IOPS performance while maintaining constant instantaneous IOPS performance. In one embodiment of the invention, the ERSB blocks are divided among J mini ERSBs (MERSBs) comprising each K data blocks (e.g., K=3). The entire user space may be divided among the J MERSBs, and in each MERSB, the allotted user space may further be divided into L (e.g., 2) LBA sets. Each MERSB may be managed by LBA splitting as is described above.

In one embodiment of the invention, in each MERSB, at each time instant, there may be two data blocks open for writing, corresponding to two user space subsets dividing the user space allotted to the said MERSB. When one of the data blocks which belongs to a first user space subset becomes full, the third data block is allocated to the same user space subset and further writes to this user space subset resume to this data block. Next, if the newly allocated data block becomes full, or if the data block of the second user space subset becomes full, merges of all LBAs corresponding to the user space subset already occupying two data blocks may then be performed causing two data blocks to be freed.

Figure 14:
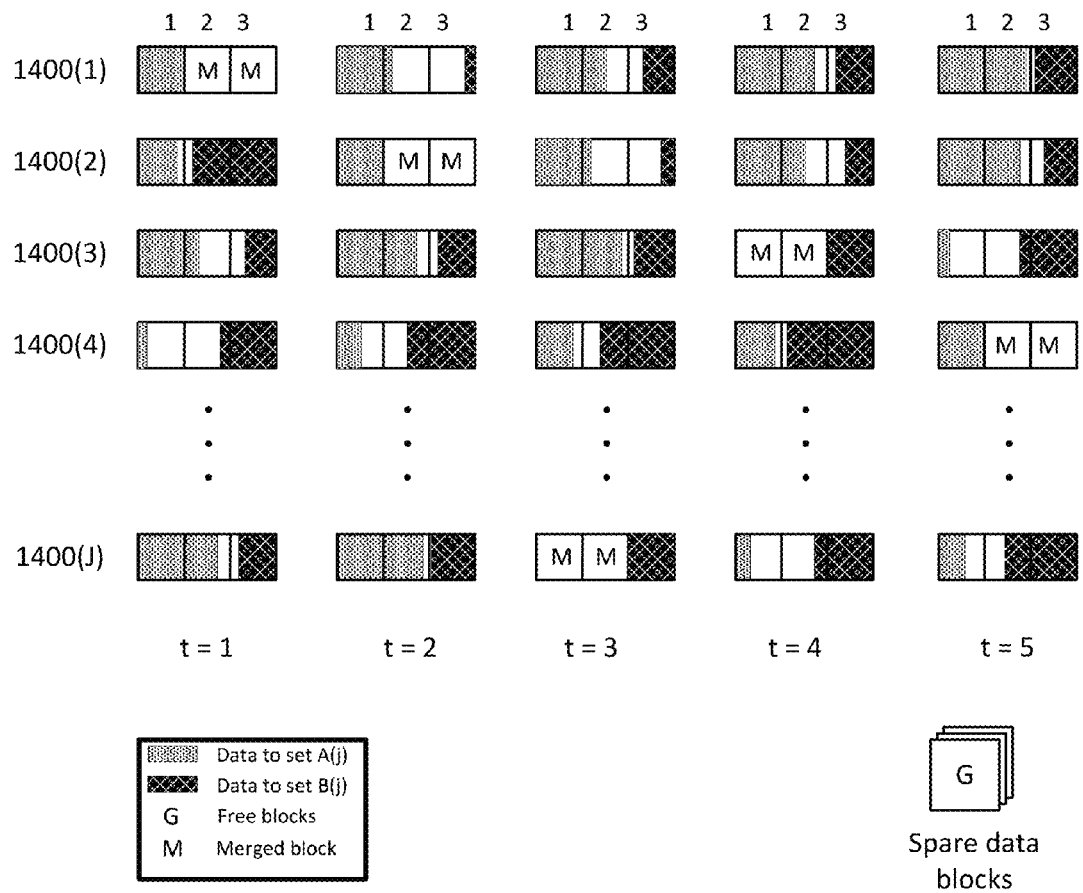
FIG. 14 illustrates various data blocks at various points of time and a multiple sub-buffers according to an embodiment of the invention.

FIG. 14 schematically shows this embodiment. Each column represents the fullness state of each data block in each of the MERSBs at some time instant. For example, MERSB 2 at time instant 1 has one data block open for writing allocated for user space subset A(2) and two data blocks (one open for writing and the other complete) allocated for user space subset B(2). Of the two data blocks allocated to user space subset B(2), one data block is complete and closed and the other is open for writing. At time instant 1, the two open data blocks have little space left in them. At time instant 2, the data block allocated to user space subset A(2) become full. At this point, the LBAs belonging to user space subset B(2) are merged, and a new data block is allocated to user space subset B(2). At time instant 3, the data block allocated to user space subset A(2) become full, and another data block is allocated to this user space subset.

In one embodiment of the present invention, the write pointers of the open data blocks are randomized at the beginning of life in order to spread the merge times as much as possible. In other embodiments, other forms of synchronization between the MERSBS may be employed to spread the merge events across time.

FIG. 14 depicts the IOPS performance of the representative ERSB system employing partitioning of the ERSB to a plurality of ERSBs with $N_p=600$, $N_L=240$, $N_e=60$, f=5, $t_w=0.001$ [sec], $t_m=1.2$ [sec], K=3, and J=18. The skilled reader may observe the gain of this scheme w.r.t. prior art in terms of increased average IOPS performance and constant instantaneous IOPS performance.

Figure 15:
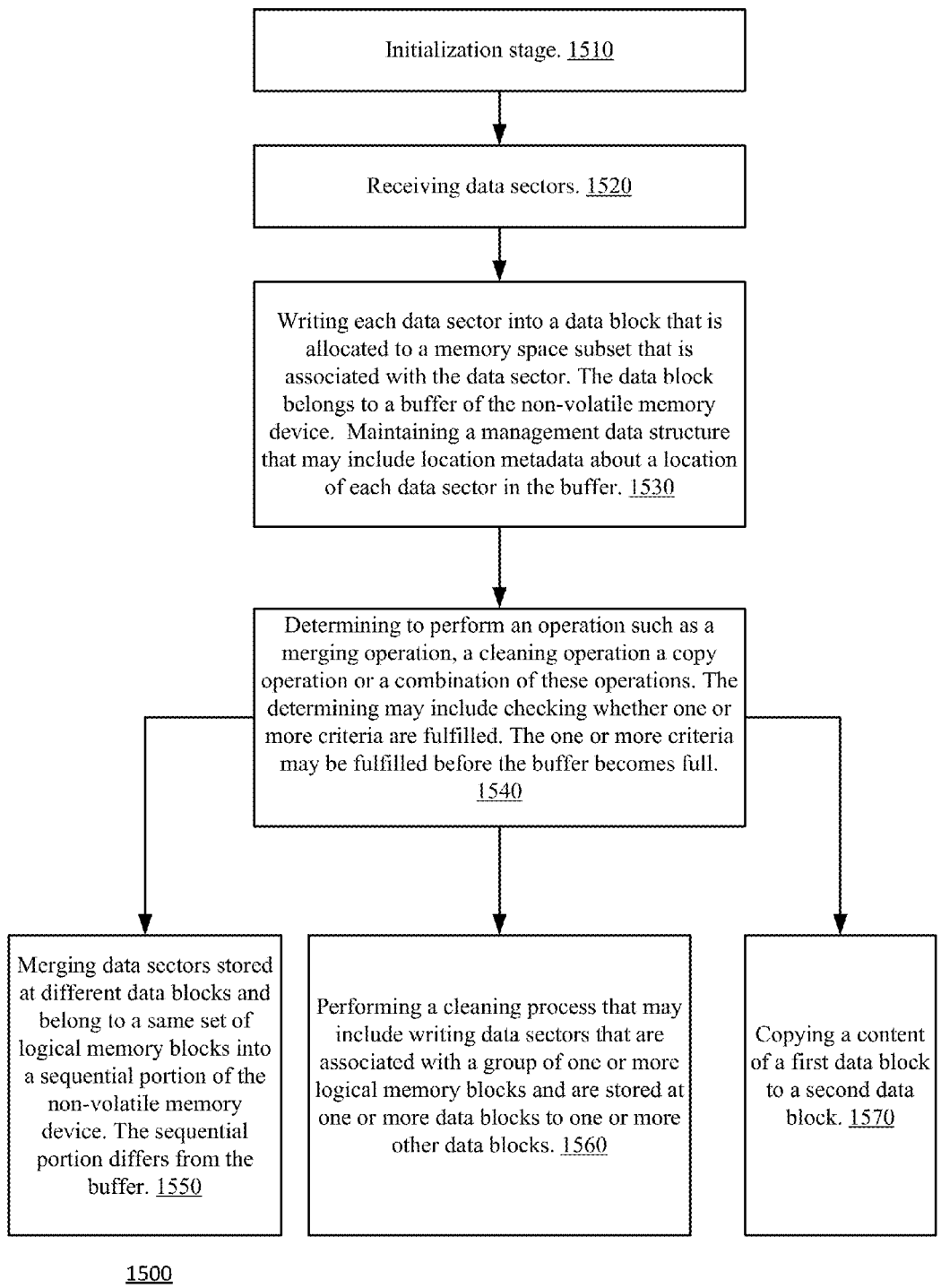
FIG. 15 illustrates a method according to an embodiment of the invention.

FIG. 15 illustrates method 1500 according to an embodiment of the invention.

Method 1500 may start by initialization stage 1510. Stage 1510 may include determining the number (n) of memory space subsets, determining the size of each memory space subset, partitioning the memory space to multiple memory space subsets and the like.

Stage 1510 may include at least one of the following stages:
  i. Allocating data blocks to the multiple memory space subsets while maintaining at least one non-full data block to each memory space subset.
  ii. Partitioning a memory space to the multiple memory space subsets.
  iii. Partitioning the memory space to uneven sized memory space subsets.
  iv. Partitioning the memory space to evenly sized memory space subsets.
  v. Determining a number (n) of the multiple memory space subsets.
  vi. Determining n in response to at least one out of: (a) an aggregate amount of data sectors received between consecutive merging operations; (b) a time required to write to the sequential portion all data blocks stored in the buffer, and (c) an amount of gap required to prevent a loss of data sectors due to a temporary absence of data blocks ready to receive new data sectors.
  vii. Computing, for each suggested number of memory space subsets out of multiple suggested numbers, a quantity in response to: (a) a number of transaction timeout durations required to perform a merge of a logical memory block; (b) an instantaneous number of logical memory blocks which have at least one associated data sectors in the buffer; (c) a number of data sectors in a data block of the buffer; (d) the suggested number of memory space subsets; (e) a time duration for writing a data sector; (f) a number of data blocks in the buffer, and (g) a time duration for performing a merge of a logical memory block; and selecting, out of the multiple suggested numbers of memory space subsets, a number that yields a highest value quantity.
  viii. Partitioning the memory space so that each memory space subset may include an integral number of logical memory blocks.

Stage 1510 may be followed by stage 1520 of receiving data sectors. Each data sector belongs to a memory space subset out of multiple memory space subsets. The multiple memory space subsets comprise a plurality of logical memory blocks.

Stage 1520 may be followed by stage 1530 of writing each data sector into a data block that is allocated to a memory space subset that is associated with the data sector. The data block belongs to a buffer of the non-volatile memory device.

Stage 1530 may also include maintaining a management data structure that may include location metadata about a location of each data sector in the buffer.

Stage 1530 may be followed by stage 1540 of determining to perform an operation such as a merging operation, a cleaning operation a copy operation or a combination of these operations. The determining may include checking whether one or more criteria are fulfilled. The one or more criteria may be fulfilled before the buffer becomes full.

A criterion may be fulfilled when a number of free data blocks of the buffer falls below a predetermined threshold. A non-limiting example of such a predetermined threshold is T. T may be regarded as a minimal value of free data blocks that can still facilitate merging without loss of data sectors.

Stage 1510 may include receiving the predetermined threshold or determining the predetermined threshold. The predetermined threshold can be determined in response to: (a) a number of transaction timeout durations required to perform a merge of data sectors that belong to a certain logical memory block; (b) an instantaneous number of logical memory blocks which have at least one associated data sector in the buffer; (c) a number of memory sectors in a data block of the buffer, and (d) a number of memory space subsets.

If it is determined to perform a merge operation then stage 1540 may be followed by stage 1550 of merging data sectors stored at different data blocks and belong to a same set of logical memory blocks into a sequential portion of the non-volatile memory device. The sequential portion differs from the buffer.

Stage 1540 may include selecting at least one logical memory block from the set of logical memory blocks (to be merged).

Stage 1540 may include selecting the set so that the set may include at least one logical memory blocks that is associated with a maximum amount of data blocks.

Stage 1540 may include selecting the set by determining a permutation transformation on a set of logical block indices; selecting a set of indices; and computing the logical block indices by employing the permutation on the set of indices.

Stage 1550 may include merging of the data sectors into the sequential portion by: merging data sectors into a plurality of erase block sections of data; writing the plurality of erase block sections of data to a plurality of erase blocks of the sequential portion; and creating for each data sector a pointer in the data management structure, the pointer corresponds to an associated logical address and to a location of an erase block in which the data sector is stored.

If it is determined to perform a cleaning operation then stage 1540 may be followed by stage 1560 of performing a cleaning process that may include writing data sectors that are associated with a group of one or more logical memory blocks and are stored at one or more data blocks to one or more other data blocks.

Stage 1560 may include determining the logical data blocks that should be cleaned. The determining may include at least one out of:
  i. Computing a quantity in response to (a) an instantaneous number of logical memory blocks which have at least one associated data sector in the buffer; (b) a number of data blocks in the buffer, and (c) a predefined constant; computing, based on said quantity and on at least one previously computed quantities, an integer number of logical memory blocks to be cleaned. This may also include selecting, based on said number of logical data blocks to be cleaned, the one or more other data blocks.
  ii. Determining a permutation transformation on a set of logical memory block indices; selecting a set of indices; and computing logical memory block indices by employing the permutation on the set of indices.
  iii. Selecting of a contiguous set of integers starting from a next index after an index, which was last used for either merging or cleaning.
  iv. Selecting of a contiguous set of integers starting from the next index after the index which was last used for either merging or cleaning, wherein indices which correspond to logical block indices which were never merged since they were last cleaned are omitted.

Stage 1560 may include updating pointers associated with the data sectors to reflect the cleaning process.

If it is determined to perform a copying operation then stage 1540 may be followed by stage 1570 of copying a content of a first data block to a second data block. The copying may be executed in response to a fullness level of the first data block—in order to assist in emptying the first data block. Referring to the example set forth in FIG. 9—copying data sector 946 from data block 210(2) to new data block 210(8) can empty data block 210(2).

Figure 16:
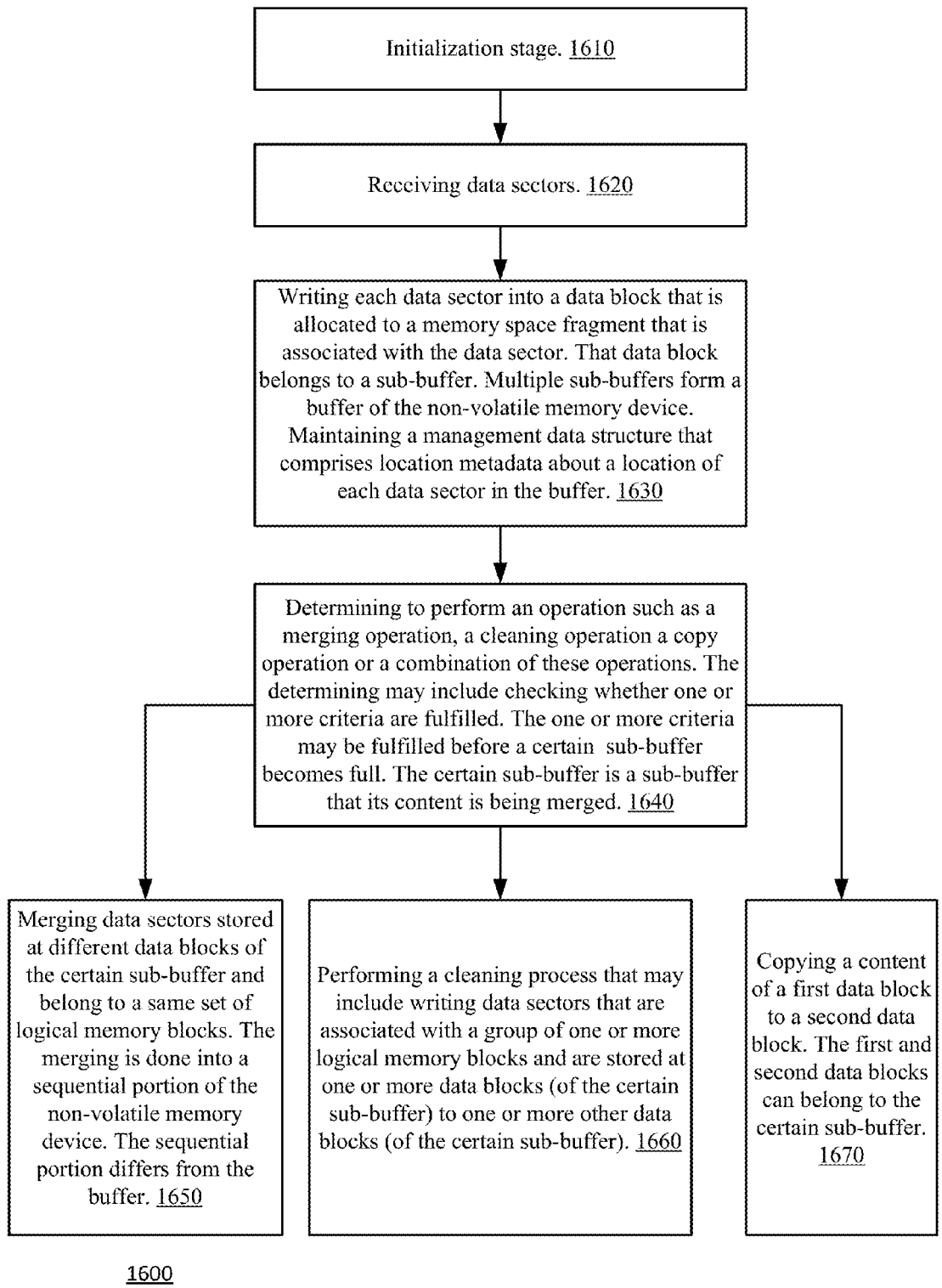
FIG. 16 illustrates a method according to an embodiment of the invention.

FIG. 16 illustrates method 1600 according to an embodiment of the invention.

Method 1600 differs from method 1500 by performing further partitions of the memory space subsets to memory space fragments, by partitioning the buffer to sub-buffers and by performing decisions based upon the state of the sub-buffers. For convenience of explanation the major differences between the two methods are illustrated below. Any stage of method 1500 can be included within method 1600 while applying the required changes.

Method 1600 may start by initialization stage 1610. Stage 1610 may include determining the number (n) of memory space subsets, determining the number of memory space fragments (larger than n), determining the size of each memory space subset, determining the size of each memory space fragment, partitioning the memory space to multiple memory space subsets and partitioning each memory space subset to multiple memory space fragments, and the like. FIG. 14 illustrates multiple data blocks that belong to multiple sub-buffers, each data block is allocated to a memory space fragment.

Stage 1610 may be followed by stage 1620 of receiving data sectors. Each data sector belongs to a memory space fragment.

Stage 1620 may be followed by stage 1630 of writing each data sector into a data block that is allocated to a memory space fragment that is associated with the data sector. That data block belongs to a sub-buffer. Multiple sub-buffers form a buffer of the non-volatile memory device. Stage 1630 may also include maintaining a management data structure that comprises location metadata about a location of each data sector in the buffer.

Stage 1630 may be followed by stage 1640 of determining to perform an operation such as a merging operation, a cleaning operation a copy operation or a combination of these operations. The determining may include checking whether one or more criteria are fulfilled. The one or more criteria may be fulfilled before a certain sub-buffer becomes full. The certain sub-buffer is a sub-buffer that its content is being merged.

If it is determined to perform a merge operation then stage 1640 may be followed by stage 1650 of merging data sectors stored at different data blocks of the certain sub-buffer and belong to a same set of logical memory blocks. The merging is done into a sequential portion of the non-volatile memory device. The sequential portion differs from the sub-buffer.

If it is determined to perform a cleaning operation then stage 1640 may be followed by stage 1660 of performing a cleaning process that may include writing data sectors that are associated with a group of one or more logical memory blocks and are stored at one or more data blocks (of the certain sub-buffer) to one or more other data blocks (of the certain sub-buffer).

If it is determined to perform a copying operation then stage 1640 may be followed by stage 1670 of copying a content of a first data block to a second data block. The first and second data blocks can belong to the certain sub-buffer.

It has been found that the performance of a system that includes a flash memory device and a memory controller using an ERSB is mainly dictated by the write amplification factor. Write Amplification (WA) is the ratio between the amount of data actually written to flash memory device and the amount of data written by the host.

For higher WA values more time is being spent on writing the data to the flash memory device and lower performance is observed by the host. Furthermore, NAND flash memory devices are cycled faster and wear out more quickly.

The actual value of the WA actually depends on the system usage patterns. For example, there are very different behaviors between the case where only a small area of the flash memory device is randomly accessed (writes) and the case where the entire flash memory device is randomly and repeatedly accessed (writes).

NL the number of logical memory blocks (LBAs) available to the host (user) as data space and by NE, the total number of logical memory blocks supported by the flash memory device. For the case where the entire flash memory device is being randomly accessed the write amplification can be approximated by:

$$WA=NL/(NE-NL)+1 \text{ or } 1/OP+1$$

Where OP is the overprovisioning in the system and is defined by (NE−NL)/NL.

On the other hand, when only a limited amount of the flash memory device is randomly accessed, the write amplification is much lower and should effectively be calculated with respect to the area being accessed and not to the overall user space. For example, if only Na LBAs out of NL user LBAs are being written (accessed), the write amplification can be approximated by $WA=Na/(NE-NL)+1$ In an actual system is neither the first usage case nor the second. Rather, an actual system will contain a mixed usage case. For example, 10% of the user memory may be randomly accessed 90% of the time while the rest of the 90% of the user memory is randomly accessed 10% of the time. The method can associate with each memory address or memory address range a temperature which is the frequency at which it is being accessed for writes.

The method illustrated below handles such mixed scenarios and best optimizes the performance and write amplification for a system with multiple temperatures.

Temperature Sensing

In general, the NAND controller collects statistics about the user/host usage. Specifically, NAND block usage statistics, as they are mapped to the user, is collected. Table 1 shows an example of the statistics being collected. Each user address is mapped into an LBA which corresponds to a flash memory block.

TABLE 1

Block usage statistics collection table

| User Block # | # of accesses to block | First access sub counter | Associated ERSB |
|---|---|---|---|
| 1 | 235 | 0 | 1 |
| 2 | 22 | 0 | 1 |
| 3 | 11 | 2 | 2 |
| 4 | 12 | 2 | 3 |

For each LBA the method collects the usage frequency by counting the number of writes to that LBA within an access window of length WS (for example WS may equal 16384). WS may be of lengths that differ from 16384.

Figure 17:
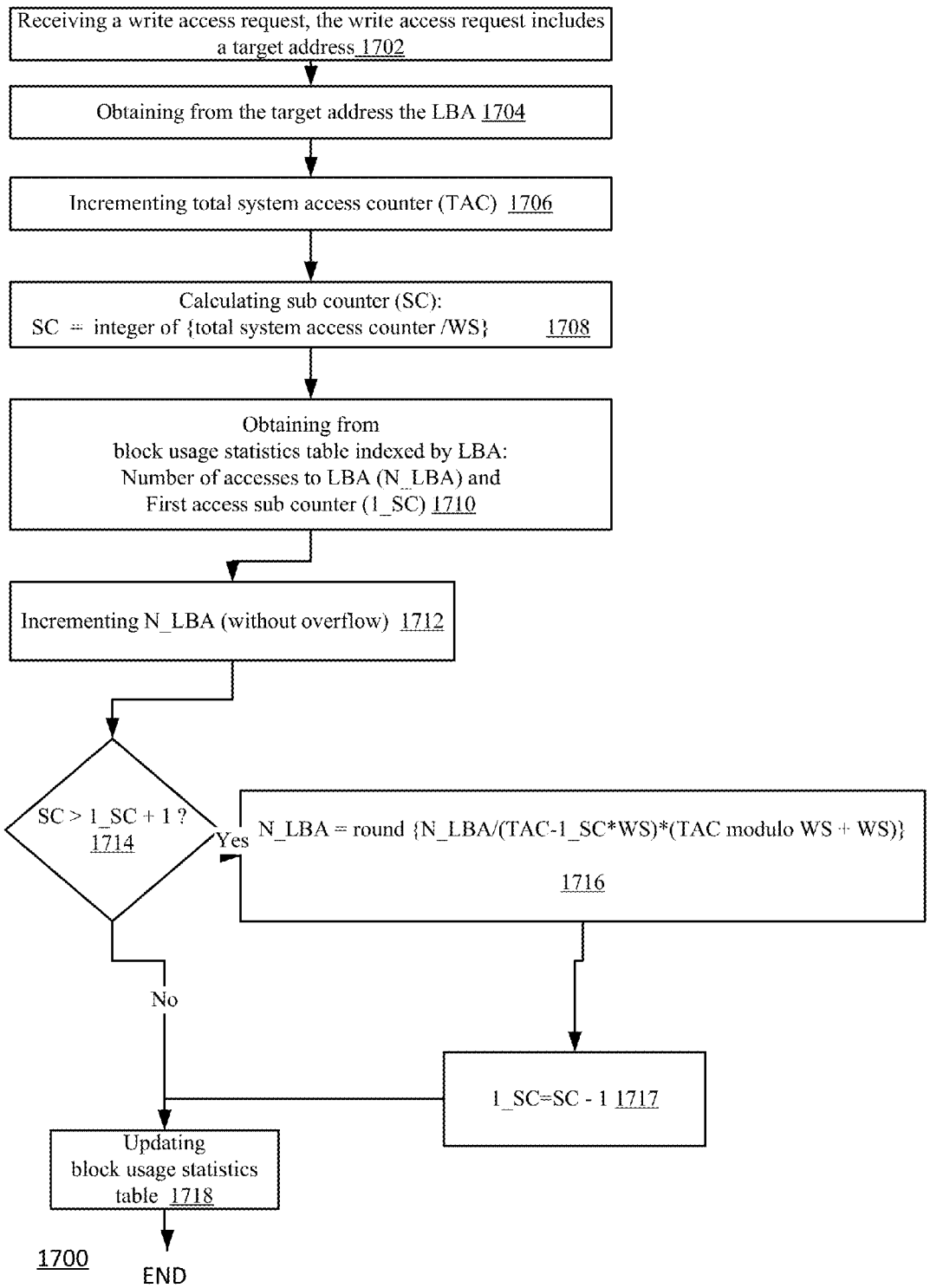
FIG. 17 illustrates a method according to an embodiment of the invention.

FIG. 17 shows how the table is updated for each write access.

When there is a need to understand the frequency of access to each block at a certain time the method can calculate the access frequency (temperature) of each LBA by counting the ratio between the accesses to the LBA (accesses within an access window) to the number of overall accesses to the flash memory module (within the access window).

When using a monotonous increasing access counter that has a range that well exceeds the access window then the frequency may be calculated by:

$Fi$=(# of accesses to block)/(total system access counter−First access sub counter*$WS$).

Method 1700 of FIG. 17 may start by stage 1702 of receiving a write access request, the write access request includes a target address.

Stage 1702 is followed by a sequence of stage 1704, 1706, 1708, 1710, 1712 and 1714.

Stage 1704 may include obtaining from the target address the LBA.

Stage 1706 may include incrementing total system access counter (TAC).

Stage 1708 may include calculating sub counter (SC):

$SC$=integer of {total system access counter/$WS$}.

Stage 1710 may include obtaining, from a block usage statistics table indexed by LBA, N_LBA and 1_SC. N_LBA being a number of accesses to LBA. 1_SC is a first access sub counter (1_SC).

Stage 1712 may include incrementing N_LBA (without overflow).

Stage 1714 may include checking if the sub counter exceeds the first access sub counter+1: SC>1_SC+1 ?. If yes—jumping to stage 1716. If no—jumping to stage 1718.

Stage 1716 includes updating the number of accesses to the LBS:

$N\_LBA$=round {$N\_LBA$/(TAC−1_$SC$*$WS$)*(TAC modulo $WS$+$WS$)}.

Stage 1716 is followed by stage 1717 of updating 1_SC: 1_SC=SC−1. Stage 1717 is followed by stage 1718.

Stage 1718 may include updating the block usage statistics table.

Multiple ERSBs

There is provided a method that hold several Extended Random Sector Buffers. Each buffer handles different memory ranges with different temperatures. More specifically, each buffer handles different LBA mapped addresses. That is, every LBA is associated with one of those ERSBs. The overall system overprovisioning is the sum of the individual ERSB overprovisioning.

Given an association of LBAs to ERSBs the method can count the number of LBAs associated with each ERSB and the overall frequency of writes to any of the LBAs associated with each ERSB.

Figure 20:
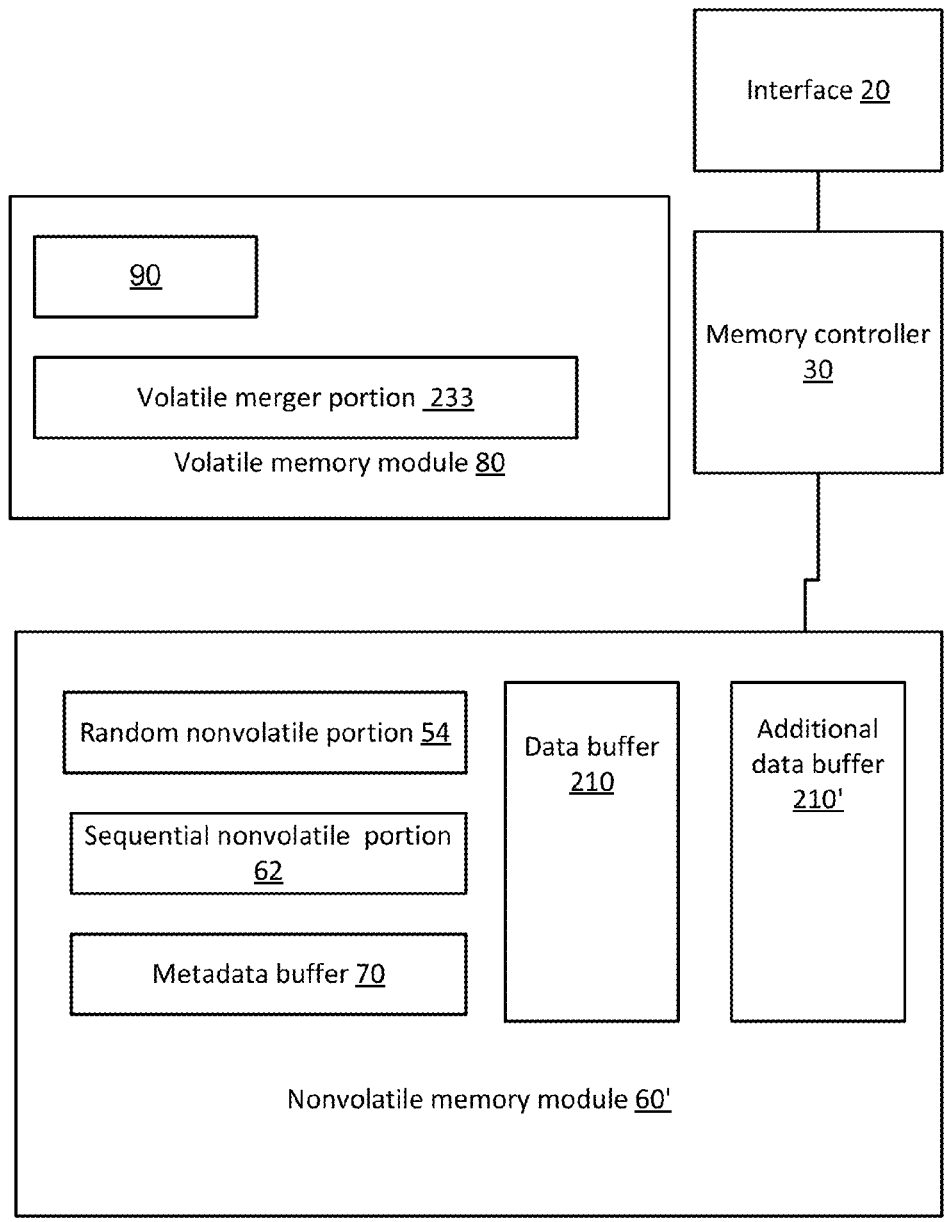
FIG. 20 illustrates a system according to an embodiment of the invention.
Figure 21:
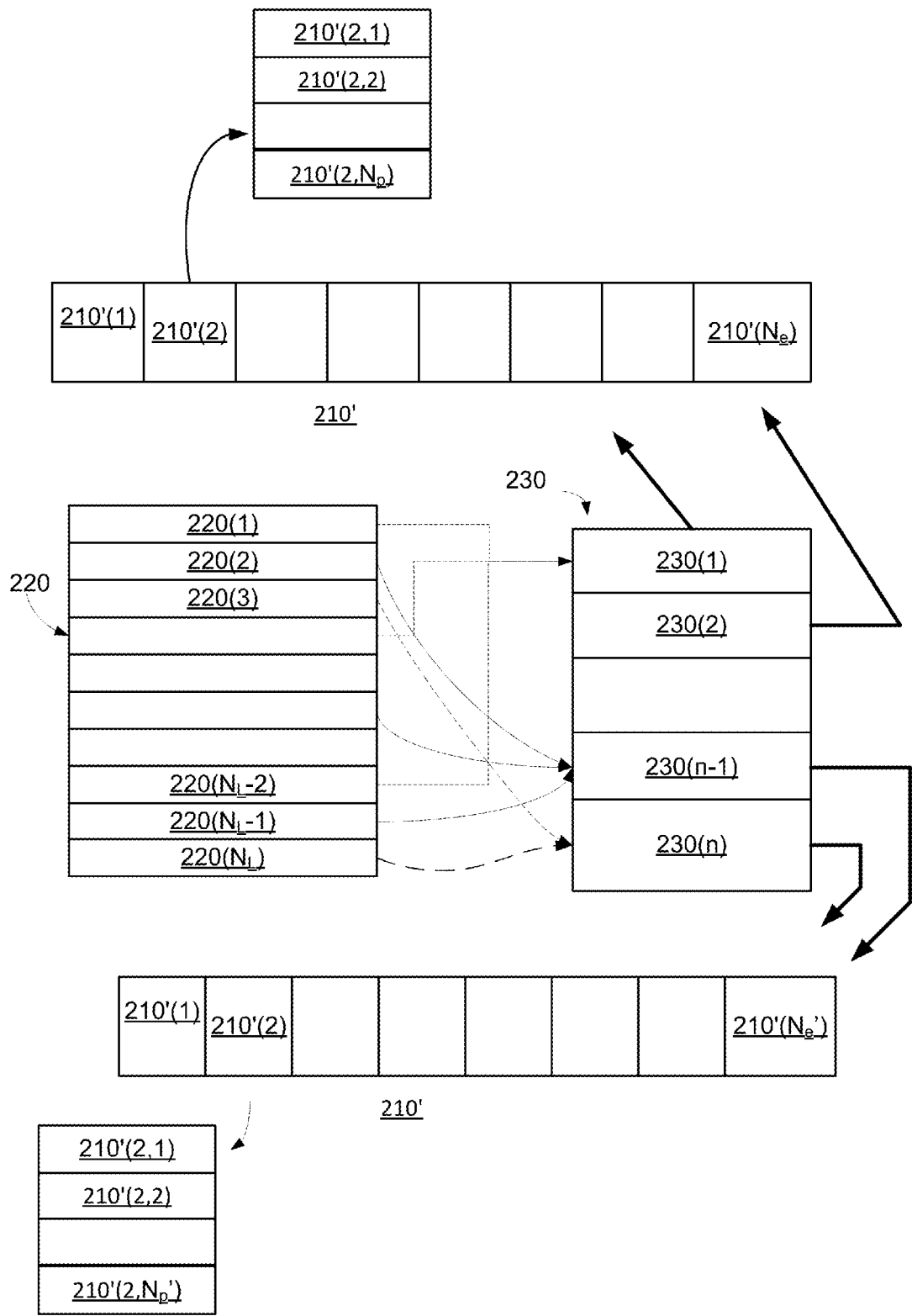
FIG. 21 illustrates data structures according to an embodiment of the invention.

For example, consider FIGS. 20 and 21 which show an example of system 10' having two data buffers (two ERSBs)—data buffer 210 and additional data buffer 210'.

Data buffer 210 has Ne data blocks 210(1)-210(Ne). Each data block may include multiple pages (data block 210(2) is illustrated as including Np data pages 210(2,1)-210(2,Np)). Each page may store one or more data sectors.

Additional data buffer 210' has Ne' data blocks 210'(1)-210'(Ne'). Each data block may include multiple pages (data block 210'(2) is illustrated as including Np' data pages 210'(2,1)-210'(2,Np')). Np' is likely to be the same as Np. Each page may store one or more data sectors.

Logical memory space (such as a user space) 220 may include multiple (N1) LBAs 220(1)-220($N_L$) and may be partitioned (according to the temperatures of the LBAs) to multiple (n) memory subsets —230(1)-230($n$). FIG. 21 illustrates that LBAs 220(1), 200($N_L$−2) and an additional (unnumbered) LBA belong (according to their temperatures) to memory space subset 230(1). LBAs 220(2), 200($N_L$−1) and an additional (unnumbered) LBA belong (according to their temperatures) to memory space subset 230($n$−1). LBAs 220(3) and 200($N_L$) belong (according to their temperatures) to memory space subset 230($n$). Different data buffers and different memory space subsets are associated with different temperature ranges.

I1 and I2 will be used to denote the sets of all blocks associated with data buffer 210 and additional data buffer 210' respectively. For example I1={1, 3, 10, 11, 12, 13, . . . } and I2={2, 4, 5, 6, 7, 8, 9, 20, . . . }. The overall frequency associated with each group is given by the sum $P_j = \Sigma_{i \in I_j} F_i$ where i∈$I_j$ is an element belonging to group j and Fi is the frequency of the specific LBA, defined above. Furthermore, the number of blocks in each group is denoted by $N_j$=|$I_j$| and the ratio $$R_j = \frac{N_j}{NL}$$

is the relative memory size associated with ERSB j (NL is the user mapped blocks defined above).

It turns out that when allocating $$\frac{\sqrt{P_j \cdot R_j}}{\Sigma_j \sqrt{P_j \cdot R_j}} \cdot (NE - NL), j = 1, 2$$

LBAs to each of the ERSBs, the write amplification is $$WA = \frac{(\Sigma_j \sqrt{P_j \cdot R_j})^2}{OP} + 1.$$

As an example, consider the case where P1=0.1, R1=0.9, P2=0.9 and R2=0.1 (that is 90% of the accesses are made to 10% of the memory and 10% of the accesses are done to the other 90% of the memory).

In that case WA=0.36/OP+1 which, for not too large OPs is almost a third of the original write amplification we would have gotten with a single ERSB that does not distinguish between blocks with different temperatures. Note that the comparison is done for the case where the overall overprovisioning (NE−NL) is the same for the two cases.

The above results can be extended to any number of ERSBs—two and above.

Block Allocation to Temperature Groups

LBAs can be allocated into groups most efficiently such that the resultant WA is lowest. The following procedure can be followed for two ERSBs but the same procedure (with appropriate adaptation) may be applied to any number of ERSBs:

1) Sort the LBAs according to their temperature Fi.
2) Divide the sorted blocks into two equal and contiguous groups. Group I contains the blocks with the lower temperatures (Fi values) and group II contains the blocks with the higher temperature.
3) Calculate a score $$S1 = \Sigma_j \sqrt{P_j \cdot R_j}$$

for each group. Pj and Rj were defined above.
4) Transfer block with highest Fi from group I to group II
5) Calculate a score $$S2 = \Sigma_j \sqrt{P_j \cdot R_j}$$

for each group
6) Transfer block with lowest Fi from group II to group I (based on groups available in stage 3, not 4)
7) Calculate a score $$S3 = \Sigma_j \sqrt{P_j \cdot R_j}$$

for each group
8) If S2 is lower than S1 and S3, choose group allocation of step 4. Otherwise, if S3 is lower than S1 and S2, choose group allocation of step 6.
9) Repeat from step 3, until group allocation is stable.

The above procedure may be performed only occasionally in order to adapt the allocation to the changing state of the system.

The above procedure may be included in stage 1824 and 1825 of FIG. 19.

Dynamic Block Allocation

The method can also perform more rapid block allocations once the base allocation is obtained from executing the mentioned above procedure.

The method can do this by occasionally updating the table, for example every few transaction or every block merge. Thus, slowly, over-time optimize the block allocation.

Methods for updating table may include:
1) Performing steps 4 to 8 for the steps above.
2) Per each LBA merge operation the method can try and reallocate that block to any of the groups and choosing the group with the lowest score $$S = \Sigma_j \sqrt{P_j \cdot R_j}$$

(where P'j and Rj are calculated for the new allocation of that particular LBA).

The above procedure may be performed only occasionally in order to adapt the allocation to the changing state of the system.

Single Temperature Sensitive ERSB

The method can also work with a single, modified ERSB unit. Normally, an extended random sector buffer contains an open data block which is currently being filled with new data. Instead, there may be provided an ERSB with multiple open data blocks which are simultaneously being filled. However, each data block will be filled with data from different LBA addresses, depending on the group allocation—depending upon their temperature. Thus—different data blocks of the ERSB will be associated with different temperature ranges. Accordingly—once a data sector is received its LBS is identified and the appropriate open data block to receive that data sector will be selected—based upon the temperature of the LBA and the association between temperature ranges and data blocks.

Normally, the method would merge data blocks into the overall pool in a steady procession. The choice of the data blocks to be merged can be optimized in order to obtain overall system performance.

The advantage of a united ERSB is that it eliminates some of the (NAND and RAM memory) overhead associated with each individual ERSB.

Figure 18:
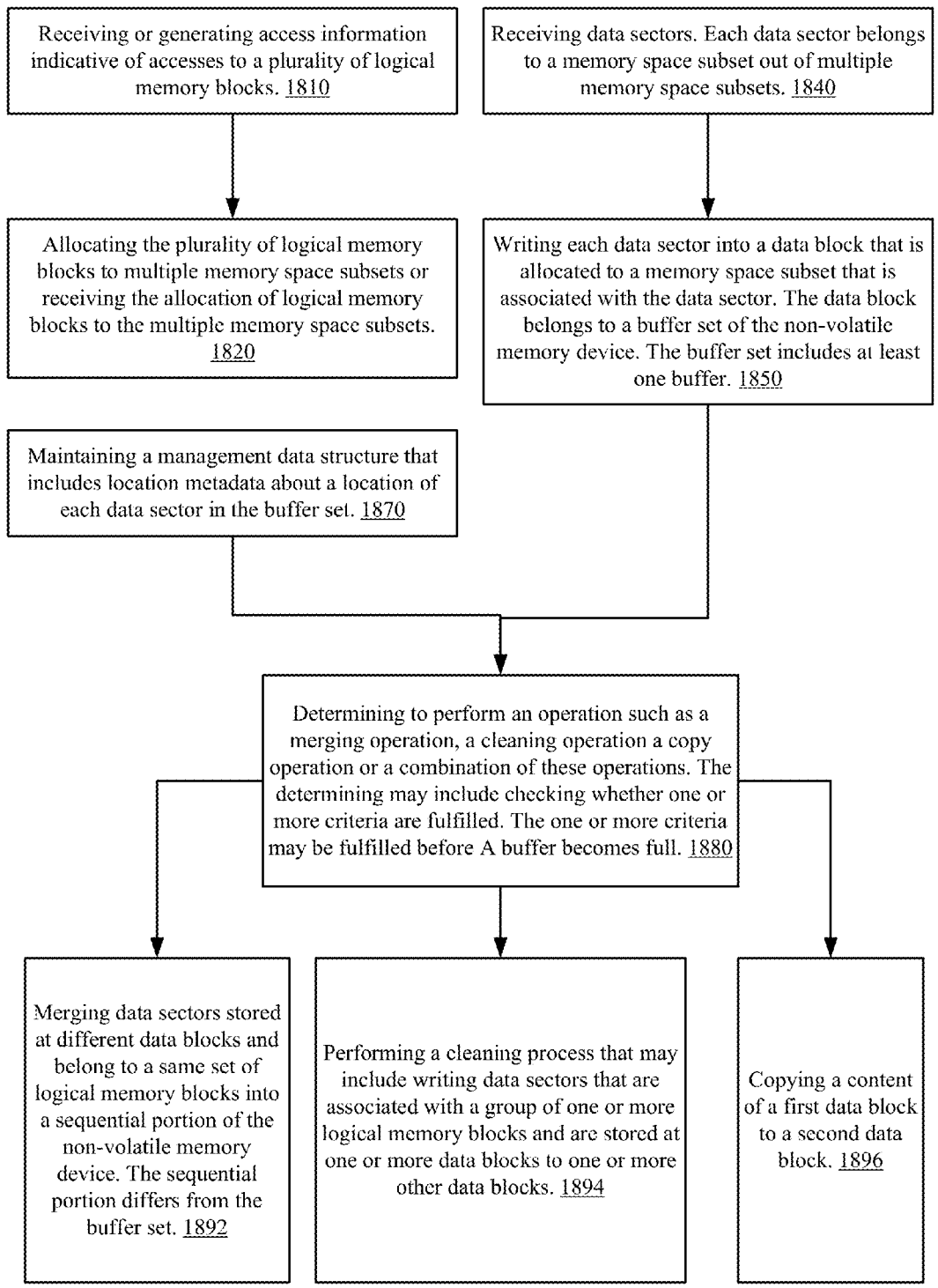
FIG. 18 illustrates a method according to an embodiment of the invention.

FIG. 18 illustrates method 1800 according to an embodiment of the invention.

Method 1800 may start by stages 1810, 1840 and 1870.

Stage 1810 includes receiving or generating access information indicative of accesses to a plurality of logical memory blocks.

Stage 1810 may be followed by stage 1820 of allocating the plurality of logical memory blocks to multiple memory space subsets or receiving the allocation of logical memory blocks to the multiple memory space subsets.

The allocation of logical memory blocks virtually partitions a memory space that includes the multiple memory space subsets. The partition (allocation) is responsive to the access information and especially to the temperatures of the plurality of logical memory blocks. A temperature of a logical memory block represents an access frequency to the logical memory block.

Stage 1820 may be repeated multiple time, at different points of time, according to a predetermined scheme, in response to an event (such as change in the access patterns), and the like.

The buffer set may include one ("single temperature sensitive ERSB") buffer or may include multiple buffers.

The multiple buffers may be associated with different temperature ranges. These different temperature ranges may be non-overlapping or may be partially overlapping.

The allocating of the logical memory blocks may be responsive to a write amplification value associated with the non-volatile memory device.

Stage 1820 may include stages 1821, 1822, 1823, 1824 and 1825—all illustrated in FIG. 19.

Stage 1820 may be aimed to reduce (and even minimize) the write amplification value. Accordingly, stage 1820 may include selecting (1821) an allocation, out of a set of allocations of logical memory blocks to the multiple buffers that exhibits a lowest write amplification value.

Stage 1820 may include allocating (1822) for each buffer (Bi) of the multiple buffers a number (Nj) of logical memory blocks, wherein the number of logical blocks allocated to each buffer is responsive to (a) a sum (Pj) of temperatures of logical memory blocks allocated to the buffer, (b) a relative size (Rj) of the buffer, and (c) a number (Nnac) of logical memory blocks of the non-volatile memory device that are not accessible to a user.

Stage 1822 may include allocating (1823) so that Ni equals Nac multiplied by a ratio between (a) a square root of (Pj*Rj), and (b) a sum, over all buffers of a square root of (Pj*Rj).

The allocation process may be an iterative process that is aimed to stabilize the allocation. Accordingly, stage 1820 may include calculating (1824) for each allocation out of multiple allocations an allocation metric to provide multiple allocation metrics; wherein the multiple allocations differ from each other by a re-allocation of memory blocks of extremum temperatures; and selecting (1825) a selected allocation out of the multiple allocations in response to values of the multiple metrics.

Referring back to FIG. 18—stage 1840 may include receiving data sectors. Each data sector belongs to a memory space subset out of multiple memory space subsets.

Stage 1840 may be followed by stage 1850 of writing each data sector into a data block that is allocated to a memory space subset that is associated with the data sector. The data block belongs to a buffer set of the non-volatile memory device. The buffer set includes at least one buffer.

Stage 1870 may include maintaining a management data structure that includes location metadata about a location of each data sector in the buffer set.

Stages 1850 and 1870 may be followed by stage 1880 of determining to perform an operation such as a merging operation, a cleaning operation a copy operation or a combination of these operations. The determining may include checking whether one or more criteria are fulfilled. The one or more criteria may be fulfilled before the buffer becomes full.

Stage 1880 may be followed (according to the determination) by one of stages 1892, 1894 and 1896.

Stage 1892 may include merging data sectors stored at different data blocks and belong to a same set of logical memory blocks into a sequential portion of the non-volatile memory device. The sequential portion differs from the buffer set.

Stage 1894 may include performing a cleaning process that may include writing data sectors that are associated with a group of one or more logical memory blocks and are stored at one or more data blocks to one or more other data blocks.

Stage 1896 may include copying a content of a first data block to a second data block.

The execution of either one of stages 1892, 1894 and 1896 may result in updating the management data structure. This update is a part of the maintaining (1870) of the management data structure.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. Moreover, if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for memory management, the method comprises:
 allocating, for each buffer (Bi) out of multiple buffers of a buffer set of a non-volatile memory device, a number (Ni) of logical memory blocks, wherein the number of logical blocks allocated to each buffer is responsive to (a) a sum (Pi) of temperatures of logical memory blocks allocated to the buffer, (b) a relative size (Ri) of the buffer, and (c) a number (Nnac) of logical memory blocks of the non-volatile memory device that are not accessible to a user;

receiving data sectors; wherein each data sector belongs to a memory space subset out of multiple memory space subsets; wherein the memory space is partitioned to the multiple memory space subsets based upon temperatures of a plurality of logical memory blocks included in the multiple memory space subsets; wherein a temperature of a logical memory block represents an access frequency to the logical memory block;

writing each data sector into a data block that is allocated to a memory space subset that is associated with the data sector; wherein the data block belongs to the buffer set;

maintaining a management data structure that comprises location metadata about a location of each data sector in the buffer set; and merging, if a criterion is fulfilled and before a buffer of the buffer set becomes full, data sectors stored at different data blocks and belong to a same set of logical memory blocks into a sequential portion of the non-volatile memory device, wherein the sequential portion differs from the buffer set.

2. The method according to claim 1 wherein the multiple buffers are associated with different temperature ranges.

3. The method according to claim 2 wherein different temperature ranges are non-overlapping.

4. The method according to claim 1 wherein the allocating of the logical memory blocks is responsive to a write amplification value associated with the non-volatile memory device.

5. The method according to claim 1 wherein the allocating of the logical memory blocks comprises selecting an allocation, out of a set of allocations of logical memory blocks to the multiple buffers that exhibits a lowest write amplification value.

6. The method according to claim 1 wherein Ni equals Nnac multiplied by a ratio between (a) a square root of (Pi*Ri), and (b) a sum, over all buffers of a square root of (Pi*Ri).

7. The method according to claim 1, comprising allocating a new data block to a given memory space subset after a data block of the buffer set data that is associated to the given memory space subset becomes full.

8. The method according to claim 1, comprising repeating, at different points of time, an allocating of logical memory blocks to the multiple memory space subsets.

9. A non-transitory computer readable medium that stores instructions that once executed by a memory controller cause the memory controller to:

allocate, for each buffer (Bi) out of multiple buffers of a buffer set of a non-volatile memory device, a number (Ni) of logical memory blocks, wherein the number of logical blocks allocated to each buffer is responsive to (a) a sum (Pi) of temperatures of logical memory blocks allocated to the buffer, (b) a relative size (Ri) of the buffer, and (c) a number (Nnac) of logical memory blocks of the non-volatile memory device that are not accessible to a user;

receive data sectors; wherein each data sector belongs to a memory space subset out of multiple memory space subsets; wherein the memory space is partitioned to the multiple memory space subsets based upon temperatures of a plurality of logical memory blocks included in the multiple memory space subsets; wherein a temperature of a logical memory block represents an access frequency to the logical memory block;

write each data sector into a data block that is allocated to a memory space subset that is associated with the data sector; wherein the data block belongs to the buffer set;

maintain a management data structure that comprises location metadata about a location of each data sector in the buffer set; and merge, if a criterion is fulfilled and before a buffer of the buffer set becomes full, data sectors stored at different data blocks and belong to a same set of logical memory blocks into a sequential portion of the non-volatile memory device, wherein the sequential portion differs from the buffer set.

10. The non-transitory computer readable medium according to claim 9 wherein the multiple buffers are associated with different temperature ranges.

11. The non-transitory computer readable medium according to claim 10 wherein different temperature ranges are non-overlapping.

12. The non-transitory computer readable medium according to claim 9 that stores instructions that once executed by the memory controller cause the memory controller to allocate the logical memory blocks in response to a write amplification value associated with the non-volatile memory device.

13. The non-transitory computer readable medium according to claim 9 that stores instructions that once executed by the memory controller cause the memory controller to allocate the logical memory blocks by selecting an allocation, out of a set of allocations of logical memory blocks to the multiple buffers that exhibits a lowest write amplification value.

14. The non-transitory computer readable medium according to claim 9 wherein Ni equals Nnac multiplied by a ratio between (a) a square root of (Pi*Ri), and (b) a sum, over all buffers of a square root of (Pi*Ri).

15. The non-transitory computer readable medium according to claim 9, that stores instructions for allocating a new data block to a given memory space subset after a data block of the buffer set data that is associated to the given memory space subset becomes full.

16. The non-transitory computer readable medium according to claim 9, that stores instructions for repeating, at different points of time, an allocating of logical memory blocks to the multiple memory space subsets.

17. A device comprising a memory controller and a non-volatile memory device;

wherein the memory controller is arranged to:

allocate, for each buffer (Bi) out of multiple buffers of a buffer set of a non-volatile memory device, a number (Ni) of logical memory blocks, wherein the number of logical blocks allocated to each buffer is responsive to (a) a sum (Pi) of temperatures of logical memory blocks allocated to the buffer, (b) a relative size (Ri) of the buffer, and (c) a number (Nnac) of logical memory blocks of the non-volatile memory device that are not accessible to a user;

receive data sectors; wherein each data sector belongs to a memory space subset out of multiple memory space subsets; wherein the memory space is partitioned to the multiple memory space subsets based upon temperatures of a plurality of logical memory blocks included in the multiple memory space subsets; wherein a temperature of a logical memory block represents an access frequency to the logical memory block;

write each data sector into a data block that is allocated to a memory space subset that is associated with the data sector; wherein the data block belongs to the buffer set;

maintain a management data structure that comprises location metadata about a location of each data sector in the buffer set; and merge, if a criterion is fulfilled and before a buffer of the buffer set becomes full, data sectors stored at different data blocks and belong to a same set of logical memory blocks into a sequential portion of the non-volatile memory device, wherein the sequential portion differs from the buffer set.

18. The device according to claim 17 wherein the multiple buffers are associated with different temperature ranges.

19. The device according to claim 18 wherein different temperature ranges are non-overlapping.

20. The device according to claim 17 wherein the memory controller is arranged to allocate the logical memory blocks in response to a write amplification value associated with the non-volatile memory device.

21. The device according to claim 17 wherein the memory controller is arranged to allocate the logical memory blocks by selecting an allocation, out of a set of allocations of logical memory blocks to the multiple buffers that exhibits a lowest write amplification value.

22. The device according to claim 17 wherein Ni equals Nnac multiplied by a ratio between (a) a square root of (Pi*Ri), and (b) a sum, over all buffers of a square root of (Pi*Ri).

23. The device according to claim 17 wherein the memory controller is arranged to allocate a new data block to a given memory space subset after a data block of the buffer set data that is associated to the given memory space subset becomes full.

24. The device according to claim 17 wherein the memory controller is arranged to repeat, at different points of time, an allocating of logical memory blocks to the multiple memory space subsets.

* * * * *